United States Patent
Wooten

(10) Patent No.: US 6,493,473 B1
(45) Date of Patent: Dec. 10, 2002

(54) METHOD AND APPARATUS FOR PROVIDING TRANSFORMATION OF THE POLARIZATION OF LIGHT

(75) Inventor: Edward L. Wooten, Windsor, CT (US)

(73) Assignee: Uniphase Telecommunciations Products, Inc., Bloomfield, CT (US)

( * ) Notice: Subject to any disclaimer, the term of this patent is extended or adjusted under 35 U.S.C. 154(b) by 0 days.

(21) Appl. No.: 09/366,090

(22) Filed: Aug. 3, 1999

(51) Int. Cl.[7] .................................................. G02B 6/00
(52) U.S. Cl. ................................ 385/11; 385/2; 385/8; 359/246
(58) Field of Search .............................. 385/1–11, 24, 385/27, 31, 46; 359/246

(56) References Cited

U.S. PATENT DOCUMENTS

| | | | |
|---|---|---|---|
| 4,390,236 A | * | 6/1983 | Alferness |
| 4,856,094 A | * | 8/1989 | Heidrich et al. |
| 5,202,941 A | | 4/1993 | Granestrand |
| 5,212,743 A | | 5/1993 | Heismann ..................... 385/11 |
| 5,359,678 A | | 10/1994 | Heismann et al. ............. 385/1 |
| 5,361,270 A | | 11/1994 | Heismann ..................... 372/27 |
| 5,611,004 A | * | 3/1997 | Chang et al. .................. 385/11 |
| 5,611,005 A | * | 3/1997 | Heismann et al. ............ 385/11 |
| 6,046,839 A | * | 4/2000 | Ito et al. ....................... 359/246 |
| 6,175,668 B1 | * | 1/2001 | Borrelli et al. ................ 385/11 |

FOREIGN PATENT DOCUMENTS

| EP | 0198245 A | 10/1986 |
|---|---|---|
| JP | 05323243 A | 3/1994 |

OTHER PUBLICATIONS

"Broadband Reset–Free Automatic Polarisation Controller", by F. Heismann et al., *Electronics Letters*, vol. 27, No. 4 (Feb. 14, 1991).

"Integrated–optic polarization controller with unlimited transformation range", by F. Heismann et al., *Appl. Phys. Lett.*, vol. 57, No. 9 (Aug. 27, 1990).

"Integrated–optical frequency translator with stripe waveguide", by F. Heismann et al., *Appl. Phys. Lett.*, vol. 45, No. 5, (Sep. 1, 1994).

"Integrated–Optical Polarization Transformer for Reset–Free Endless Polarization Control", by Fred Heismann, *IEEE Journal of Quantum Electronics*, vol. 25, No. 8 (Aug. 1989).

"Wavelength–Tunable Electrooptic Polarization Conversion in Birefringent Waveguides", by Fred Heismann et al., *IEEE Journal of Quantum Electronics*, vol. QE–24, No. 1 (Jan. 1988).

"Automatic polarisation demultiplexer for polarisation–multiplexed transmission systems", by F. Heismann et al., *Electronics Letters*, vol. 29, No. 22 (Oct. 28, 1993).

"Automatic Compensation of First–Order Polarization Mode Dispersion In A 10 Gb/s Transmission System", by Fred Heismann et al., Date and Journal unknown.

(List continued on next page.)

*Primary Examiner*—Hemang Sanghavi
(74) *Attorney, Agent, or Firm*—McCormick, Paulding & Huber LLP

(57) ABSTRACT

Disclosed are methods and apparatus for providing endless transformation of the polarization of light. A polarization splitter splits light having an input polarization into beams having substantially orthogonal polarizations. The beams are provided as substantially copolarized to a pair of optical waveguides which are selectively optically coupled. Electrodes apply selected electric fields to the optical waveguides for providing transformation of the input polarization to a selected output polarization. The outputs of the optical waveguides are provided as substantially orthogonally polarized to a combiner for providing a beam of output light having the selected output polarization.

41 Claims, 8 Drawing Sheets

OTHER PUBLICATIONS

"Electrooptic Polarization Scramblers For Optically Amplified Long–Haul Transmission Systems", by F. Heismann et al., European Conference on Optical Communications, *Conference Proceedings*, (1994).

"Fast Automatic Polarization Control System", by F. Heismann et al., *IEEE Photonics Technology Letters*, vol. 4, No. 5 (May 1992).

"Integrated–Optical Single–Sideband Modulator and Phase Shifter", by Fred Heismann et al., *IEEE Journal of Quantum Electronics*, vol. QE–18, No. 4 (Apr. 1982).

"Evolution of polarization along a single–mode fiber", by A. Simon et al., *Appl. Phys. Lett.*, vol. 31, No. 8 (Oct. 15, 1977).

"Existence of eigen polarization modes in anisotropic single–mode optical fibers", by Jun–ichi Sakai et al., vol. 6, No. 10 (Oct. 1981).

"Statistical Theory of Polarization Dispersion in Single Mode Fibers", by G.J. Foschini et al., *Journal of Lightwave Technology*, vol. 9, No. 11 (Nov. 1991).

"Polarization Behavior in Multiply Perturbed Single–Mode Fibers", by Jun–ichi Sakai et al., *IEEE Journal of Quantum Electronics*, vol. QE–18, No. 1 (Jan. 1982).

"Polarization–Maintenance Limites in Polarization–Maintaining Fibers and Measurements", by Frederick M. Sears, *Journal of Lightwave Technology*, vol. 8, No. 5 (May 1990).

"Assessment of the Polarisation Loss Dependence of Transoceanic Systems Using a Recirculating Loop", by D.J. Malyon et al., *Electronics Letters*, vol. 29, No. 2 (Jan. 21, 1993).

"Polarization Hole–Burning in Erbium–Doped Fiber–Amplifier Transmission Systems", by Neal S. Bergano et al., European Conference on Optical Communication, *Conference Proceedings* (9/94).

Transmission of Light through Birefringent and Optically Active Media: the Poincaré Sphere, by H.G. Jerrard, *Journal of the Optical Society of America*, vol. 44, No. 8 (Aug. 1954).

"Poincaré sphere representation of birefringent networks", by Mark Johnson, *Applied Optics*, vol. 20, No. 12 (Jun. 15, 1981).

"Origins and Control of Polarization Effects in Single–Mode Fibers", by Scott C. Rashleigh et al., *Journal of Lightwave Technology*, vol. LT–1, No. 2 (Jun. 1983).

"Polarization optics of twisted single–mode fibers", by R. Ulrich et al., *Applied Optics*, vol. 18, No. 13 (Jul. 1, 1979).

"Origins and Control of Polarization Effects in Single–Mode Fibers", by Scott C. Rashleigh, *Journal of Lightwave Technology*, vol. LT–1, No. 2 (Jun. 1983).

"Observation of Ber Degradation due to Fading in Long–Distance Optical Amplifier System", by S. Yamammoto et al., *Electronics Letters*, vol. 29, No. 2 (Jan. 21, 1993).

"Polarization in Optical Fibers", by Ivan P. Kaminow, *IEEE Journal of Quantum Electronics*, vol. QE–17, No. 1 (Jan. 1, 1981).

"PMD and Time–Varying CSO", by James J. Refi et al., *Optical Network News* (Spring 1993).

"Polarization Mode Dispersion of Short and Long Single–Mode Fibers", by Nicolas Gisin et al., *Journal of Lightwave Technology*, vol. 9, No. 7 (Jul. 1991).

"A Generalized Geometrical Representation of Coupled Mode Theory", by Nicholas J. Frigo, *IEEE Journal of Quantum Electronics*, vol. QE–22, No. 22 (Nov. 1986).

"Fabry–Perot resonator composed of a photoinduced birefringent fiber grating", by Chao–Xiang Shi, *Applied Optics*, vol. 33, No. 30 (Oct. 20, 1994).

"HP 11896A and 8169A Polarization Controllers", Hewlett Packard Product Datasheet—No Date Available.

"Polarization Transformers With Fewer Control Elements", by J.L. Nightingale et al., Crystal Technology, Inc. 1040 E. Meadow Circle, Palo Alto, CA 94303.

"Electro–optic waveguid TE⇌TM mode converter with low drive voltage", by R.C. Alferness et al., *Optics Letter*, vol. 5, No. 11 (Nov. 1980).

"Analysis of a Reset–Free Polarization Controller for Fast Automatic Polarization Stabilization in Fiber–optic Transmission Systems", by Fred Heismann, *Journal of Lightwave Technology*, vol. 12, No. 4 (Apr. 1994).

"Low loss, wavelength tunable, waveguid electro–optic polarization controller for $\lambda=1.32\,\mu m$", by R. C. Alferness et al., *Appl. Phys. Lett.*, vol. 47, No. 11 (Dec. 1, 1985).

"Polarization–State Control Schemes for Heterodyne or Homodyne Optical Fiber Communcations", by Takanori Okoshi, *Journal of Lightwave Technology*, vol. LT–3, No. 6 (Dec. 1985).

"Lithium niobate guided–wave network for a coherent receiver", by H. Heidrich et al., *Optics Letters*, vol. 14, No. 1 (Jan. 1, 1989).

"Polarization Dependent Loss in a Ti: $LiNbO_3$ Polarization Scrambler/Controller", by Takumi Fujiwara et al., *IEEE Photonics Technology Letters*, vol. 8, No. 4 (Apr. 1996).

"10Gb/s PMD Compensation Using Deformed–Helical Ferroelectric Liquid Crystals", by D. Sandel et al., European Conference on Optical Communications, *Conference Proceedings*, Madrid, Spain (Sep. 20–24, 1998).

"Automatic polarisation mode dispersion compensation in 40 Gbit/s optical transmission system", by D. Sandel et al., *Electronics Letters*, vol. 34, No. 23 (Nov. 12, 1998).

Ionas Product Datasheet on"Voltage controlled optical polarisation controller"—Date Unknown.

"In–line fiber–optical polarization transformer", by Mark Johnson, *Applied Optics*, vol. 18, No. 9 (May 1, 1979).

"Polarization Control for Coherent Fiber–Optic Systems Using Nematic Liquid Crystals", by Scott H. Rumbaugh et al., *Journal of Lightwave Technology*, vol. 8, No. 3 (Mar. 1990).

"Polarization mode dispersion in single–mode fibers", by S.C. Rashleigh et al., *Optics Letters*, vol. 3, No. 2 (Aug. 1978).

"Endless Polarization Control Systems for Coherent Optics", by Reinhold Noé et al., *Journal of Lightwave Technology*, vol. 6, No. 7 (Jul. 1988).

"Electrooptic Guided–Wave Device for General Polarization Transformations", by Rod C. Alferness, *IEEE Journal of Quantum Electronics*, vol. QE–17, No. 6 (Jun. 1981).

"Polarization Control for Coherent Communications", by Nigel G. Walker et al., *Journal of Lightwave Technology*, vol. 8, No. 3 (Mar. 1990).

"Real–Time Measurements of Polarization Fluctuations in an Optical Fiber Submarine Cable in a Deep–Sea Trial Using Electrooptic $LiNbO_3$ Device", by Yoshinori Namihira et al., *Journal of Lightwave Technology*, vol. 7, No. 8 (Aug. 1989).

"Polarization–independent electro–optically tunable narrow–band wavelength filter", by W. Warzanskyj et al., *Appl. Phys. Lett.*, vol. 53, No. 1 (Jul. 4, 1988).

"Long-term polarization-mode-dispersion measurement of installed optical submarine cable", by Toshio Kawazawa et al., *OFC '94 Technical Digest.*

"Wavelength dependence of birefringence in single-mode fiber", by W. Eickhoff et al., *Applied Optics,* vol. 20, No. 19 (Oct. 1, 1981).

"Polarization Mode Dispersion Measurement in Elliptical Core Single-Mode Fibers by a Spatial Technique", by N. Shibata et al., *IEEE Journal of Quantum Electronics,* vol. QE-18, No. 1 (Jan. 1982).

"Polarization Fluctuation Measurements on Installed Single-Mode Optical Fiber Cables", by Grant Nicholson, *Journal of Lightwave Technology,* vol. 7, No. 8 (Aug. 1989).

"Polarisation Mode Dispersion Measurements in 1520km EDFA System", by T. Namihira et al., *Electronics Letters,* vol. 28, No. 9 (Apr. 23, 1992).

"Polarisation Effects on BER Degradation at 10 Gbit/s in an IM-DD, 1520km Optical Amplifier System", by Y. Namihira et al., *Electronics Letters,* vol. 29, No. 18 (Sep. 2, 1993).

"New Polarization Scrambler Using Ti: LiNbO$_3$ Rotating Waveplate", by David A. Smith et al., Bellcore, 331 Newman Springs Road, Red Bank, NJ 07701-7020.

"Wavelength-Tunable Single-Mode Fibre Grating Reflector", by M.S. Whalen et al., *Electronics Letters,* vol. 22, No. 24 (Nov. 20, 1986).

"Polarization Stabilizer Using a Polarization Splitter and a Thermooptic Polymer Waveguide Device", by Wol-Yon Hwang et al., *IEEE Photonics Technology Letters,* vol. 10, No. 12 (Dec. 1998).

"Demonstration of an Optimal Polarization Scrambler for Long-Haul Optical Amplifier Systems", by F. Bruyère et al., *IEEE Photonics Technology Letters,* vol. 6, No. 9 (Sep. 1994).

"Birefringence measurement of fiber-optic devices", by Y. Yen et al., *Applied Optics,* vol. 20, No. 15 (Aug. 1, 1981).

"Electrooptic Polarization Scrambler for Optically Amplified Long-Haul Transmission Systems", by F. Heismann et al., *IEEE Photonics Technology Letters,* vol. 6, No. 9 (Sep. 1994).

Four (4) charts entitled "Optical Compensation of First-Order Polarization Mode Dispersion in Lightwave Systems", by T. Ozeki et al., "Electrical Compensation of First-Order Polarization Mode Dispersion in Lightwave Systems", by J.H. Winters et al., "Adaptive Polarization Diversity Receiver with Electrical Differential Group Delay Equalization", by J.H. Winters, and "Adaptive Automatic Compensation of First-Order Polarization Mode Dispersion in a 10-Gb/s Transmission System", by F. Heismann et al., European Conference on Optical Communications, *Conference Proceedings,* (1998).

Advanced Optronics, Inc. Product Datasheet on "Fiberoptic Polarization Controller".

E-TEK Dynamics, Inc. Product Datasheet on Fiberoptic Polarization Controller (FPCR).

"Three-Space Representation of Phase-Mismatch Switching in Coupled Two-State Optical Systems", by Steven K. Korotky, *IEEE Journal of Quantum Electronics,* vol. QE-22, No. 6 (Jun. 1986).

"Birefringent optical filters in single-mode fiber", by Y. Yen et al., *Optics Letters,* vol. 6, No. 6, pp. 278-280 (Jun. 1981)

"Single-mode-fiber birefringent filters", by Mark Johnson, *Optics Letters,* (Apr. 1980).

\* cited by examiner

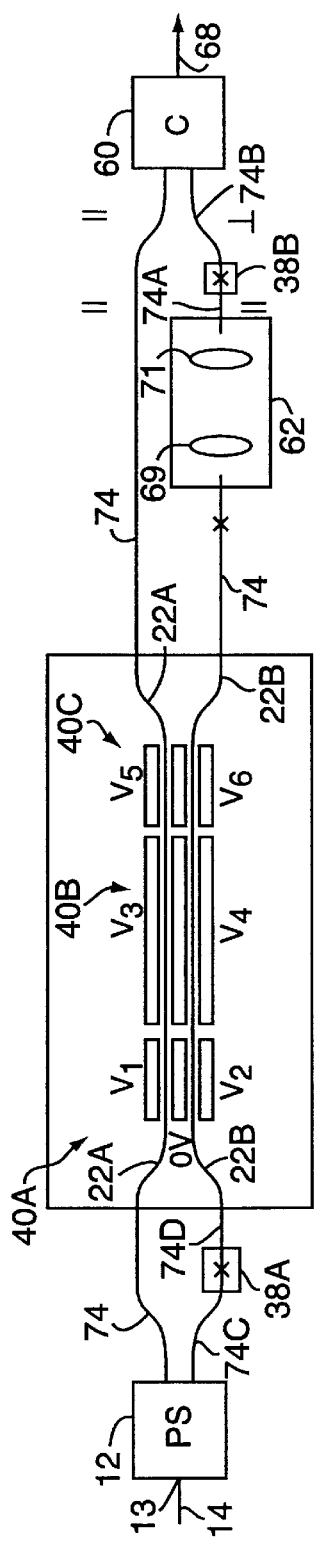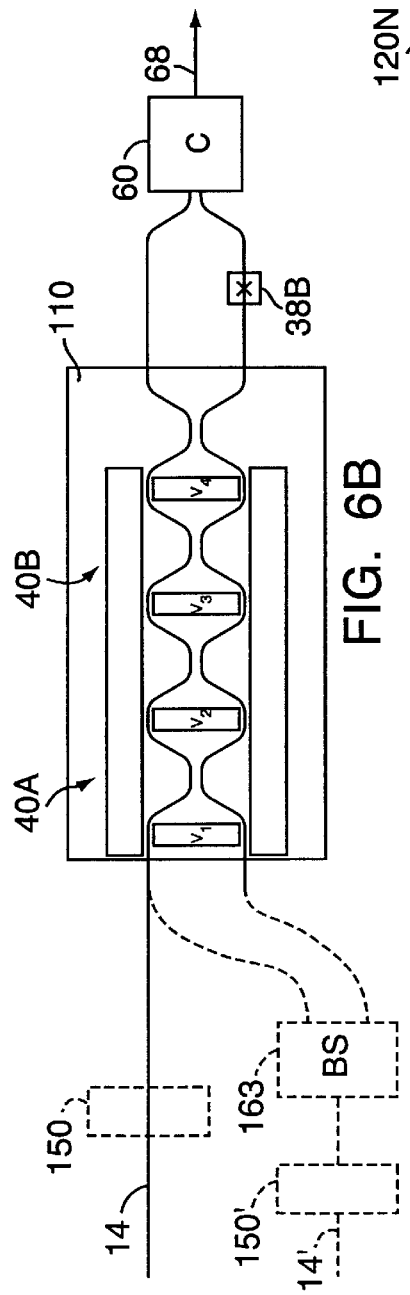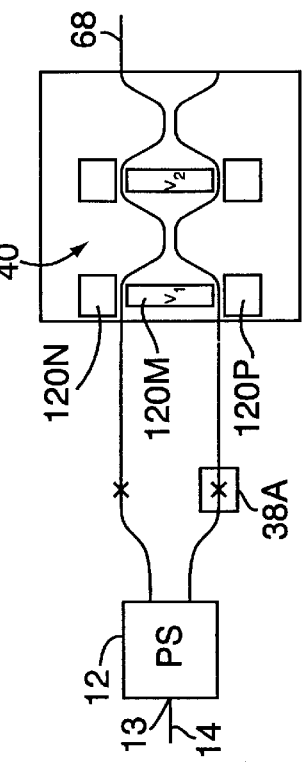

METHOD AND APPARATUS FOR PROVIDING TRANSFORMATION OF THE POLARIZATION OF LIGHT

FIELD OF THE INVENTION

This invention relates to methods and apparatus for the control of the phase and magnitude of light, and more particularly, to an endless polarization transformer for transforming the state of polarization (SOP) of light.

BACKGROUND OF THE INVENTION

In a typical optical communication system, an optical transmitter generates an optical beam and modulates the beam with an electrical signal representative of the information to be transmitted by the communication system. An optical fiber propagates the modulated optical beam to a receiver that demodulates the optical beam to recover the electrical signal. Fiber amplifiers, disposed at appropriate intervals in the fiber optic link between the transmitter and the receiver, maintain the strength of the modulated optical beam. The low loss, light weight, small size, flexibility and high intrinsic bandwidth of optical fiber make optical communication systems highly desirable for the communication of both of digital and analog signals. Examples of optical communication systems include cable TV (CATV) systems, telephone and other cross-country or cross-continent communication systems, and other microwave and RF systems, such as phased array antenna systems used by the military. DWDM (Dense Wavelength Division Multiplexing) systems are also becoming increasingly popular, as they increase the bandwidth of existing optical fibers by transmitting multiple beams, each of a different wavelength and representing a different channel for the communication of information, over the optical fiber.

One important concern with optical communication systems is control of the polarization of the light beam (referred to herein as the state of polarization, or SOP) received by the various optical components in the optical communication system. Polarization is property of light relating to the direction in space of the vibrations of the electromagnetic fields of which light is composed. For example, the electric field of the light can vibrate along either or along both of two orthogonal axes of a coordinate system, where the orthogonal axes of the coordinate system define a plane that is perpendicular to a third axis along which the light propagates. For example, assume that a light beam is propagating along the z axis. The electric field can vibrate solely along the direction of the x axis, can vibrate solely along the direction of the y axis, or can vibrate along both axes, in which case the SOP of the light is determined by the superposition of the orthogonal polarization components, i.e., of the vibrations along the y axis and along the x axis. The superposition can result in the electric field vector tracing out particular shapes in the x-y plane, such as a circle or an ellipse. The shape and the direction in which it is traced (counterclockwise or clockwise) are determined by the relative phase and magnitude of the orthogonal polarization components of the light beam, and correspond to a particular SOP.

Transmitters and receivers, as well as other components often present in an optical communication system, such as modulators and photonic switches, add-drop multiplexors, etc., are typically designed to operate with light having a particular SOP. However, as is well known to those of ordinary skill in the art, the SOP of a light beam often changes as the beam propagates in the optical communication system. These changes can be random over time. Thus although the transmitter may transmit the proper SOP that would result, if unchanged, in efficient operation of the other components in the optical communication system, the SOP changes as the beam propagates, and the performance of one or more of the components, and hence of the overall optical communication system, can suffer. The use of polarization maintaining optical fiber can reduce the problem of changes of the SOP, but such optical fiber is expensive, does not typically totally eliminate changes of the SOP, and hence is typically only used in short lengths to interconnect adjacent components.

Polarization transformers are known in the art. A polarization transformer can receive the light beam prior to delivery of the beam to the receiver or other optical component and transform the SOP of the beam to the SOP that the receiver or other component is designed to process. For example, it is known in the art that any input SOP can be transformed into any desired output SOP by a cascade of two quarter-wave plates and a half-wave plate. The half-wave plate is placed in between the quarter-wave plates, and each plate is disposed at a selected angle, where the angles can be, and often are, selected to be different. Varying the selected angles varies the SOP to which the input polarization of the beam is transformed.

Mechanical polarization transformers that use a cascade of quarter-wave and half-wave plates are available. However, such mechanical devices are inherently slow, bulky, complex, and not readily miniaturized. Polarization transformers are often combined with devices that track the input or output SOP and a controller for automatically controlling the transformer such that the varying input SOP is continuously transformed to the desired output SOP, which usually should not vary over time.

Another device known in the art is a "fiber squeezer" polarization transformer. However, this device is also mechanical and can require the use of complicated "reset" algorithms. "Reset" is a known phenomenon wherein a polarization transformer is controlled by a parameter that can only vary over a finite range. As the tracking and controlling described above progresses, the control parameter can approach one of its limits, and must be reset to a value within the control parameter range to continue to properly transform the SOP. During the reset the transformed polarization varies from the desired output SOP, and this can result in the loss of signal, and hence information received by the receiver or other component while the transformer is reset. Such loss is considered unacceptable in many applications. A polarization transformer that does not require a reset is known in the art as an "endless" polarization transformer, and is more desirable. The quarter-wave and half-wave transformer cascade discussed above is one example of an endless polarization transformer, because the waveplates can be endlessly rotated without reaching a limit.

Other optical apparatus useful for endless polarization transformation are disclosed in U.S. Pat. Nos. 5,212,743; 5,359,678; and 5,361,270, issued May 18, 1993, Oct. 25, 1994, and Nov. 1, 1994, respectively, and all of which include Heismann as an inventor. These patents are referred to herein as the "Heismann patents," and all are herein incorporated by reference. A polarization transformer using the apparatus disclosed in the Heismann patents uses cascaded electrode sections and a titanium indiffused optical waveguide realized on z-propagating lithium niobate. The cascaded electrode sections apply electric fields to the optical waveguide for inducing a selected phase shift between, and a selected relative amplitude between, the orthogonal components of the polarization of the light propagated by the optical waveguide. (In such a waveguide, the orthogonal components of polarization of the light are often referred to as the TM mode and the TE mode. Transfer of power between the orthogonal polarization components is referred to as mode conversion, and changing the relative phase of the orthogonal polarization components referred to as mode phase shifting.) The voltages are placed on the electrodes to produce electric fields that vary, via the electrooptic effect of the electrooptic lithium niobate substrate, the above conversion and phase shift such that the overall SOP determined by the superposition of the TE and TM modes is the desired output SOP.

The devices disclosed in the Heismann patents are often constructed and operated as the electronic analogs of the quarter-wave plate, half-wave plate, quarter-wave plate mechanical device described above, without, however, the limitations on the speed of operation. Although the devices are useful, readily miniaturized and represent an advance in the art, rather high voltages can be required on the electrodes to produce the necessary electric fields. Producing and controlling such voltages can increase the complexity and expense of optical communication systems. Furthermore, the loss introduced by the apparatus is different for each of the orthogonal polarization components, which can result in the transformed SOP differing from the desired polarization.

Liquid crystal polarization transformers and guided wave polarization transformers are also known in the art, but can suffer from the one of more of the disadvantages noted above in reference to other types of transformers, such as being too slow for many applications.

Additional information on known polarization transformers can be found in "Polarization-State Control Schemes for Heterodyne or Homodyne Optical Fiber Communications," Takanori Okoshi, Journal of Lightwave Technology, Vol. LT-3, No. 6, December 1985, pages 1232–1237, herein incorporated by reference.

Accordingly, it is an object of the present invention to address one or more of the foregoing deficiencies and disadvantages of the prior art.

It is another object of the invention to provide improved methods and apparatus for the control of the relative phase and magnitude of light beams, such as can be useful in applications such as the transformation of the polarization of light.

Other objects will be apparent to those of ordinary skill in the art in light of the following disclosure, including the claims.

SUMMARY OF THE INVENTION

In one aspect, the invention provides an optical apparatus for transforming the polarization of light from an input polarization to a selected output polarization. The optical apparatus includes a pair of electrooptic optical waveguides, each electrooptical waveguide of the pair having an input and an output, and the pair having at least one coupled section. A plurality of electrodes are provided for exposing the optical waveguides of said pair to selected electric fields. The apparatus also includes one or both of an input beam splitter and a beam combiner.

The input beam splitter includes an input and two outputs. The input receives light having the input polarization and splits the light into two outputs. Each of the outputs is in optical communication with a different input of the optical waveguides of the pair and this optical communication is achieved so as to provide substantially copolarized light to the electrooptic optical waveguides of the pair.

The optical combiner includes first and second combiner inputs and a combiner output. Each of the inputs is in optical communication with a different output of the optical waveguides of said the of optical waveguides, and this optical communication is achieved such that the inputs receive light from the pair of optical waveguides as substantially orthogonally polarized.

In operation, selective application of voltages to the electrodes produces the electric fields such that the light having the input polarization and entering either one of the inputs of the electrooptical optical waveguide pair or, if the beam splitter is present, the input of the beam splitter, is transformed to light having the selected polarization and emanating from one the outputs of one of the electrooptic optical waveguides, or when present, the output of the beam combiner.

The optical apparatus can include a time delay element for providing a selected time delay between the light signal emanating from the two optical waveguides. The time delay element interposed between one of the waveguides and one of the inputs to the combiner. The time delay can be added for compensating for polarization mode dispersion. Also, the invention can include a linearizing element disposed upstream of the beam splitter such that the input polarization of the light received by the beam splitter is always a linear polarization. A polarization rotator can be disposed between one of the outputs of the electrooptic optical waveguides of the pair and one of the inputs of the combiner for achieving the optical communication between the combiner and the pair of optical waveguides such that the light received by the inputs of the combiner is substantially orthogonally polarized.

The beam splitter can be a polarizing beam splitter, where the outputs thereof provide substantially orthogonal components of the light entering the input of the beam splitter. A polarization rotator is disposed between one of the outputs of the beam splitter and one of the inputs of the electrooptic optical waveguides of the pair for achieving the optical communication with the optical waveguides such that the light provided to the optical waveguide is substantially copolarized.

The plurality of electrodes can include a plurality of sections of coplanar electrodes, where each section includes an inner electrode spaced from a pair of outer electrodes by a pair of gaps. For each coplanar electrode section a selected length of each optical waveguide of the pair is disposed proximate a different gap of the pair of gaps for being exposed to electric field lines extending between those electrodes spaced so as to form the different gap. The at least one coupled section can include a plurality of coupled sections of the pair of optical waveguides, the coupled sections being alternately interposed with the sections of coplanar electrodes.

The at least one coupling section can include the optical waveguides of the pair being disposed within a selected distance of each other for a selected coupling length along each of the optical waveguides. The at least one coupling section can also include a junction between the optical waveguides of the pair of optical waveguides.

The optical apparatus of the invention can also include a SOP element for providing a feedback signal responsive to the output polarization and a controller responsive to the feedback signal and in electric communication with the electrodes for selectively applying voltage to the electrodes responsive to the feedback signal.

In yet another aspect, the invention provides an optical apparatus for selectively controlling the polarization of light. The apparatus includes at least first and second transformer sections. Each of the transformer sections includes the following: an electrooptic substrate material; a pair of optical waveguides disposed with the electrooptic substrate material; and at least one section of coplanar electrode structure disposed with the electrooptic substrate material, where the coplanar electrode section includes an inner electrode spaced from a pair of outer electrodes by a pair of gaps such that a first length of each optical waveguide of the pair is disposed proximate a different gap of the pair of gaps for being exposed to electric fields developed proximate the different gap. The optical waveguides of the pair are selectively optically coupled for selectively transferring light energy therebetween.

In addition, the pairs of optical waveguides of the transformer sections are in optical communication to form first and second optical waveguides each having an input end and an output end downstream of the input end. The optical apparatus also includes a polarization splitter having an input and two outputs, the outputs for providing substantially orthogonally polarized components of the light entering the input of the polarization splitter, one of the outputs in optical communication with the input of the first optical waveguide and the other of the outputs in optical communication with the input of the second optical waveguide, the optical communication being achieved such that the light received by the first and second optical waveguides is substantially copolarized. Also included is an optical combiner having first and second combiner inputs and a combiner output. One of the combiner inputs in optical communication with the output of the first optical waveguide and the other the combiner inputs in optical communication with the output of the second optical waveguide. Selective application of voltages between the inner electrodes and the outer electrodes of the transformer sections can selectively transform light of a predetermined polarization entering the input of the input polarization splitter into output light, emanating from the output of the optical combiner, having a selected polarization.

In another aspect, there is provided according to the invention an optical apparatus for selective control of the phase and magnitude of light, where the optical apparatus includes an electrooptic substrate and an elongate, substantially planar electrode section disposed with the electrooptic substrate, and first and second optical waveguides disposed with the substrate for propagating first and second optical beams, respectively. The electrode section includes an inner electrode disposed between first and second outer electrodes spaced from the inner electrode to form first and second gaps therewith, respectively. A first length of the first optical waveguide is disposed proximate the first gap so as to be exposed to electric field lines extending between the inner and first electrodes and a length of the second optical waveguide is disposed proximate the second gap so as to be exposed to electric field lines extending between the inner and second outer electrodes. The first optical waveguide has an input and an output, and the second optical waveguide has an input and an output.

The lengths of the first and second optical waveguides are further disposed for providing a selected optical coupling therebetween, whereby voltages of the same polarity applied to the outer electrodes relative to the inner electrode primarily affects one of the phase difference between the first and second beams and energy transfer between the first and second beams and voltages of opposite polarity applied to the first and second electrodes relative to the inner electrode primarily affects the other of the phase difference and the energy transfer.

In yet a further aspect, according to the invention there is provided an optical apparatus for selective control of the phase and magnitude of light. The optical apparatus includes an electrooptic substrate, first and second optical waveguides disposed with the substrate for transmitting first and second optical beams, respectively, where each optical waveguide of the pair has an input and an output downstream of the input end, and a plurality of first and second section types alternately interposed. The first section type includes an elongated coplanar electrode section disposed with the electrooptic substrate, the coplanar electrode section including an inner electrode spaced from a pair of outer electrodes by a pair of gaps wherein a selected length of each optical waveguide of the pair is disposed proximate a different gap of the pair of gaps for being exposed to electric fields extending between those electrodes spaced so as to form the different gap. The second section type includes a selected length of the pair of optical waveguides wherein the optical waveguides are spaced from each other so as to provide a selected optical coupling therebetween along the selected length. The plurality of first and second section types includes at least two sections of the first type and two sections of the second type. In operation, a first selected voltage applied between the inner and outer electrodes of one of the first type sections can vary the relative phase between the first and second beams and a second selected voltage applied between the inner electrode and outer electrodes of another of the first type sections can vary the relative magnitude of the first and second beams.

The invention also includes methods practiced in accordance with the teachings herein.

In one aspect, the invention provides a method of transforming the polarization of light from a predetermined polarization to a selected polarization, where the method includes the following steps: splitting an input beam of the light of the predetermined polarization into first and second beams; providing first and second electrooptic optical waveguides, selected lengths of the optical waveguides being optically coupled; providing the first and second beams, respectively, to the first and second electrooptic optical waveguides, each having a respective output, the step of providing including providing the first and second beams to the optical waveguides as substantially copolarized; selecting first and second electric fields to apply, respectively, to the first and second electrooptic optical waveguides; applying the first and second selected electric fields, respectively, to the first and second electrooptic optical waveguides; and combining the first and second beams downstream of the outputs of the first and second electrooptic optical waveguides to form an output beam having the selected polarization. The step of selecting the first and second electric fields includes selecting the fields such that the beams, when combined, form the output beam having the selected polarization.

In another aspect, the invention provides a method of transforming the polarization of light from a predetermined polarization to a selected polarization, where the method includes the following steps: splitting an input beam of the light of the predetermined polarization into first and second beams having substantially orthogonal polarizations; copolarizing the beams; adjusting at least one of the relative phase and the magnitude of the two copolarized beams; orthogonally polarizing the beams; and combining the two beams to form an output beam having the selected polarization, wherein the step of adjusting includes adjusting the at least one of the relative phase and the magnitude of the beams such that the beams, when orthogonally polarized and combined, form the output beam having the selected polarization.

Note that if the light having the predetermined polarization is known to be substantially linearly polarized, or if the some loss of power can be tolerated, the step of splitting the beam need not always be performed. For example, in yet a further aspect of the invention, there is provided a method of transforming input light having a predetermined polarization to output light having a selected polarization, where the method includes the following steps: providing a pair of optical waveguides including at least one coupled section, each optical waveguide of said pair having an input and an output; providing the input light to at least one of the inputs of the pair of electrooptic optical waveguides; varying the index of refraction of at least one section of at least one of waveguides of the pair; rotating the polarization of the light emanating from the output of one of the optical waveguides such the rotated polarization is orthogonal to the polarization of light emanating from the output of the other electrooptic optical waveguide of the pair; and combining the light having the rotated polarization with the light emanating from the output of the other electrooptic optical waveguide to form output light. The step of varying the index of refraction includes varying the index such that the input light having the predetermined polarization is transformed to the output light having the selected polarization. If desired, the input light can be linearized prior to providing the input light to one or both of the optical waveguides of the pair of optical waveguides. When the step of providing a pair of optical waveguides includes providing a pair of electrooptical waveguides, the input light tends to be linearized as it propagates along the electrooptic optical waveguide, if the waveguide propagates predominantly the one of the TM or TE modes, and not the other of the TM and TE modes.

If it is desired to provide output light having a substantially linear polarization, it is not always necessary to perform the step of combining the light from the outputs of the optical waveguides. For example, according to yet an additional aspect of the invention, there is provided a method of transforming input light having a predetermined polarization to output light having a selected polarization, where the method includes the following steps: splitting the input light into two orthogonally polarized beams; rotating the polarization of the light of one of the beams such that the light of the beams is copolarized; providing a pair of optical waveguides including at least one coupled section, each optical waveguide of said pair having an input and an output; providing each of the beams to different input of said optical waveguides of the pair of optical waveguides; and varying the index of refraction of at least one section of at least one of waveguides of the pair such that the light meaning from one of the outputs of the electrooptical waveguides of the pair has the selected polarization.

The steps of providing the pair of optical waveguides recited above can include providing a pair of electrooptic optical waveguides, and the steps of varying the index of refraction of at least one section of at least one of the waveguides can include applying a selected electric field to one or both of the optical waveguides for varying the index of refraction via the electrooptic effect.

BRIEF DESCRIPTION OF THE DRAWINGS

A more complete understanding of the invention will be attained from the following detailed description and the accompanying drawings, in which:

FIG. 6A illustrates another embodiment of an optical apparatus according to the invention.

FIG. 6B illustrates yet another embodiment of an optical apparatus according to the invention;

FIG. 6C illustrates an additional embodiment of an optical apparatus according to the invention.

DETAILED DESCRIPTION

Figure 1:
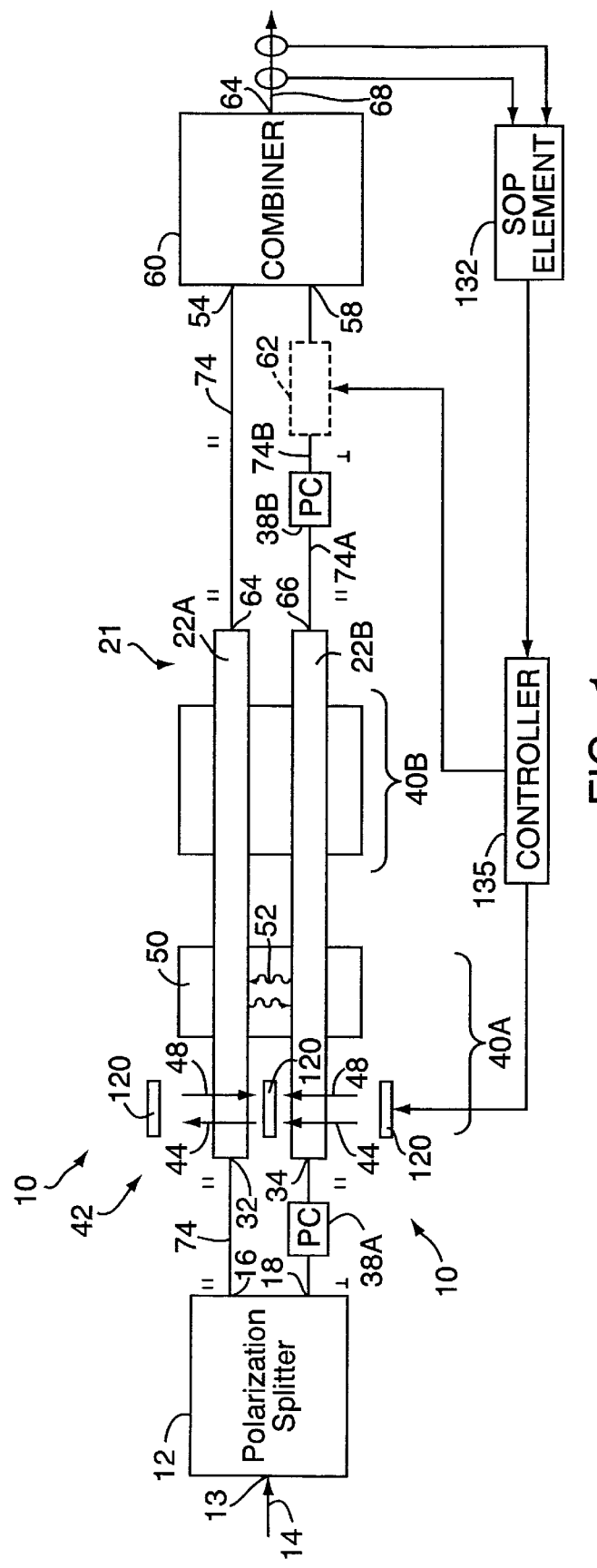
FIG. 1 schematically illustrates an optical apparatus according to the invention for transforming the polarization of light from an input SOP to a selected output SOP.

FIG. 1 schematically illustrates an optical apparatus 10 according to the invention for transforming the polarization of light from a predetermined input SOP to a selected output SOP. The polarization splitter 12 receives, at an input 13 thereof, light having an input polarization, as indicated by reference numeral 14. The polarization splitter 12 provides substantially orthogonally polarized components of the input light 14 at the outputs 16 and 18, each of which is in optical communication with a different optical waveguide of the pair 21 of optical waveguides 22A and 22B. Preferably, the optical waveguides 22A and 22B are electrooptical optical waveguides, as is discussed in more detail below. The optical communication between the polarization splitter 12 and the pair 21 is achieved such that the substantially orthogonal components of the input light 14 are provided to the inputs 32 and 34 of the optical waveguides 22A and 22B, respectively, as substantially copolarized. For example, the polarization rotator 38 can be included as shown in FIG. 1 for transforming the polarization of one of the components such that the light entering the inputs 32 and 34 of the optical waveguides 22A and 22B is substantially copolarized. The term "rotator" is used herein to avoid confusion with the term "controller," which is used in conjunction with the overall function of the apparatus of the invention. "Rotator" should not be taken to limit one or both of the components 38A and 38B to a particular type of device, such as the Farady rotator known in the art.

Each of the optical waveguides 22A and 22B optically communicates with a different input of the inputs 54 and 58 of the optical combiner 60, and this optical communication is achieved such that the light provided to the inputs 54 and 58 is substantially orthogonally polarized. For example, as shown in FIG. 1, the output 64 of the optical waveguide 22A optically communicates with the input 54 of the combiner 60, and the output 66 of the optical waveguide 22B optically communicates with the input 58 of the optical combiner 60 via the polarization rotator 38B which transforms the polarization of the light prior to entering the input 58 such that it is copolarized with the light entering the input 54. The light entering the optical waveguides 22A and 22B remains substantially copolarized as it propagates along the waveguides.

The transformer section 40A includes a coupling section 50 wherein the optical waveguides 22A and 22B are optically coupled for transferring light energy therebetween, as indicated by the wavy lines 52. The coupling section 50 of the pair 21 of the optical waveguides 22A and 22B can support at least two modes. According to the invention, at least one of the relative phase and the relative magnitude of the light beams propagating along the optical waveguides 22A and 22B is adjusted to such that the light 14 having the input polarization is transformed to light emanating from the output 64 having the desired output polarization.

Preferably, the waveguides 22A and 22B are electrooptic and the transformer section 40A exposes each to electric fields 42 for the aforementioned variation of the relative phase and/or the magnitude of the light beams propagating in the optical waveguides 22A and 22B. The electric fields can have symmetric components, as indicated by reference numerals 44, and asymmetric components, as indicated by reference numerals 48, or a combination of both symmetric components 44 and asymmetric components 48, and the aforementioned adjustment of the phase and magnitude is accomplished via the selection of the components 44 and 48 of the electric field 42. Typically, an electrode structure having a plurality of electrodes 120 is provided for selectively exposing the optical waveguides 22A and 22B to the electric fields 42.

Additional transformer sections, such as transformer section 40B, can be included for enhancing the range of output polarizations to which the predetermined input polarization can be transformed, or enhancing the range of predetermined input polarizations that can be transformed to a selected output polarization, or to provide additional degrees of freedom to compensate for non-ideal device characteristics.

A time delay element 62 can be included for providing a selected time delay to one of the components of the output light 68. For example, the time delay element 62 can be included between the output 64 of the optical waveguide 22A and the input 54 of the combiner 60 or between the output 66 of the optical waveguide 22B and the input 58 of the optical combiner 60. The time delay element helps compensate for signal distortion due to Polarization mode dispersion (PMD) introduced by the optical communication system. PMD refers to the phenomenon wherein one orthogonal component of the polarization of a light beam propagates at a different velocity than the other orthogonal component of the polarization, and can result in the output SOP of the light varying from the input SOP, as well as signal distortion. The time delay element 62 can add a selected time delay for compensating for PMD and reducing signal distortion. A typical time delay element 62 known in the art includes a pair of lenses 69 and 71 (see FIG. 6A), at least one of which is mounted on a translatable stage. The translatable stage varies the distance between the lenses for varying the time delay.

In a preferred embodiment of the optical apparatus 10, the apparatus 10 includes three transformer sections 40A–40C, (40C not shown in FIG. 1) where each of the transformer sections being operated so as to be analogous to a different one of the plates of the quarter-wave, half-wave, quarter-wave plate combination known in the art to provide endless polarization transformation, and also includes the time delay element 62. In theory, three such transformer sections can transform any input polarization on the Poincare sphere to any selected output polarization on the Poincare sphere.

Prior art polarization transformers, such as those disclosed in the U.S. Heismann Pat. Nos. 5,212,743, 5,359,678 and 5,361,270, include a titanium indiffused optical waveguide fabricated on x-cut, z-propagating lithium niobate. The titanium indiffused waveguide receives the light having the input polarization and propagates both the orthogonal polarization components thereof, that is, the waveguide propagates both TE and TM modes that makeup the overall SOP of the input light. The overall SOP is transformed via a combination of transfer of energy between the orthogonal polarization components, also referred to as TM-TE or polarization mode conversion, and introduction of a phase shift between the orthogonal polarization components, referred to as TM-TE phase shift, or polarization phase shift. Electrode sections are provided wherein each electrode section includes a common ground electrode on top of the optical waveguide and two outer electrodes placed symmetrically on both sides of the optical waveguide. Polarization mode conversion is induced via the $r_{61}$ electrooptic coefficient by applying a common voltage to the two outer electrodes relative to the inner electrode and phase shifting between the modes is accomplished via the $r_{22}$ and $r_{21}$ electrooptic coefficients by applying opposite voltages to the outer electrodes. Both orthogonal polarizations propagate in the titanium indifused waveguide, and the overall state of polarization (SOP) determined by the superposition of the orthogonal polarization components.

According to one aspect of the present invention, it is disclosed that the functions of polarization mode conversion and polarization mode phase shift in a single waveguide propagating both orthogonal polarizations can be converted to conversion and phase shifting between first and second modes supported by a coupled section of a pair of optical waveguides, where the optical waveguides propagate light of substantially the same polarization. The present invention can thus reduce performance penalties arising from polarization dependent loss and can also advantageously reduce the control voltages used to provide the electric fields 42, because, for example, the $r_{33}$ electrooptic coefficient can be used to produce the desired conversion and phase shifting between the modes. The present invention can also reduce the sensitivity of the polarization transformer to performance degradation due to misalignment of optical waveguides.

Application of control, or bias, voltages to the electrodes 120 to provide the selected asymmetric and symmetric electric fields, 44 and 48 respectively, is discussed in more detail below.

As is appreciated by those of ordinary skill in the art, in light of the disclosure herein, each of the various components illustrated in FIG. 1 can be physically realized in a number of different ways.

For example, the polarization splitter can be a conventional fiber optic polarization splitter, or can be a free space polarizing beam splitter, such as a plate or cube beamsplitter. Also, as is known in the art, a polarization splitter 12 can be fabricated using an electroptic substrate material, such as lithium niobate. See, for example, FIG. 7 of the present application and "Polarization-Independent Electro-Optically Tunable Narrow-Band Wavelength Filter," W. Warzanskyj, F. Heismann, and R. C. Alferness, Applied Physics Letters, 53(1), Jul. 4, 1988, p 13–15, herein incorporated by reference.

Figure 2A:
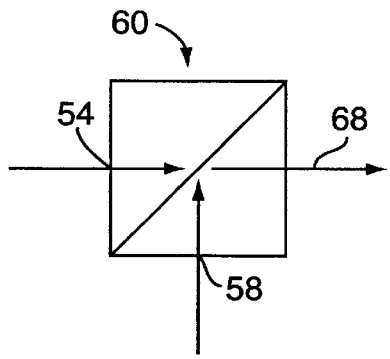
FIG. 2A illustrates one example of the combiner of the optical apparatus of FIG. 1.
Figure 2B:
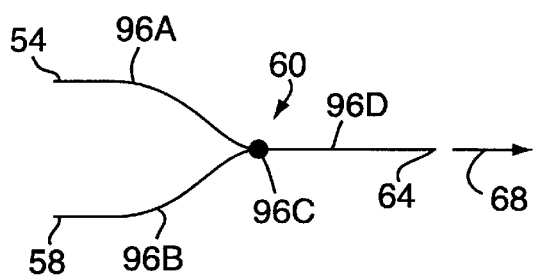
FIG. 2B illustrates another example of the combiner of the optical apparatus of FIG. 1.
Figure 2C:
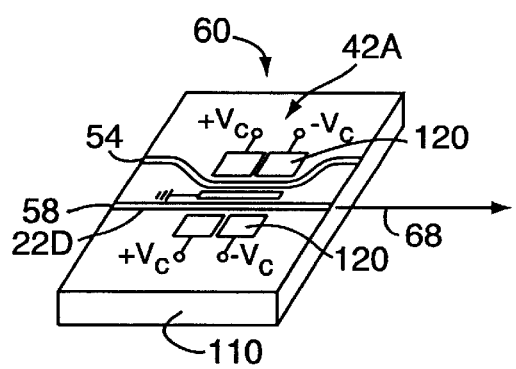
FIG. 2C illustrates yet another example of the combiner of the optical apparatus of FIG. 1.

The combiner 60 can be very similar to the polarization splitter 12, with the inputs and outputs reversed, and typically devices known in the art to be suitable for the polarization splitter 12 can also be used as the combiner 60. For example, the combiner 60 can include a cube polarization splitter 90 arranged as shown in FIG. 2A and having inputs 54 and 58, as well as output 64, from which light 68 having the selected output polarization emanates. FIG. 2C illustrates the structure disclosed in the aforementioned article entitled "Polarization-Independent Electro-Optically Tunable Narrow-Band Wavelength Filter," and that, with appropriate voltages applied to the electrodes 120, is suitable for use as the combiner 60 or as the polarization splitter 12. The combiner 60 shown in FIG. 2C includes optical waveguides 22C and 22D, which are electrooptic. Alternatively, the combiner 60 can include an optical waveguide structure having arms 96A and 96B and 96D and a junction 96B therebetween, as shown in FIG. 2B. The inputs 54 and 58 and output 64 are also shown.

Figure 2D:
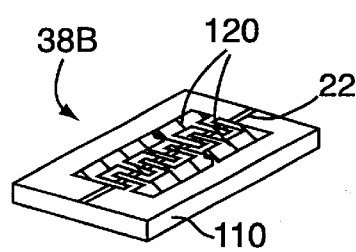
FIG. 2D illustrates one example of the polarization rotator of FIG. 1.

One or both of the polarization rotators 38A and 38B can be the low control voltage interdigitated TM-TE mode shifters shown in FIG. 2D and disclosed in "Electro-optic Waveguide TE-TM Mode Converter With Low Drive Voltage," R. C. Alferness and L. L. Buhl, Optics Letters, Vol. 5, No. 11, November 1980, pp. 473–475, herein incorporated by reference. The polarization rotator 38B shown in FIG. 2D includes an electrooptic substrate 110, optical waveguide 22, and interdigitated electrodes 120.

Figure 2E:
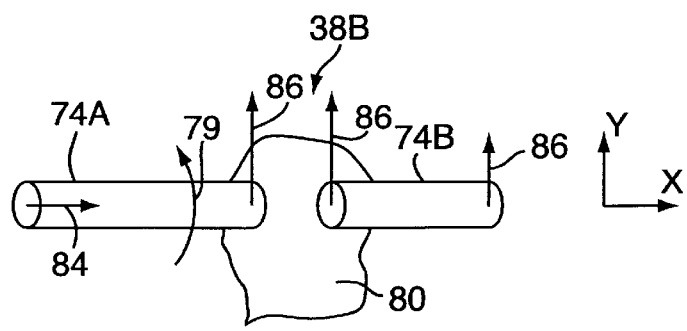
FIG. 2E illustrates another example of the polarization rotator of FIG. 1.

As shown in FIG. 2E, one or both of the polarization rotators 38A and 38B can include first and second lengths, 74A and 74B, of polarization maintaining fiber, wherein one of the fibers is rotated at 90 degrees relative to the other fiber, as indicated by reference numeral 79, and the fibers are joined by index matching material 80, or by fusing the glass at high temperature, as are known in the art. For example, the fiber length 74 is rotated such that the linearly polarized light having an electric field electric field vector 84 in the x direction is rotated so as to have the y-directed electric field vector 86, which then enters and is preserved by the fiber length 74B as the light propagates along the fiber length 74B. The fiber length 74B can then optically communicates the light, for example, to the input 58 of the combiner 60 of FIG. 1.

Farady rotators, such as optical fiber Faraday rotators, are also known in the art and can be used as the polarization rotator 38A and/or 38B.

Figure 2F:
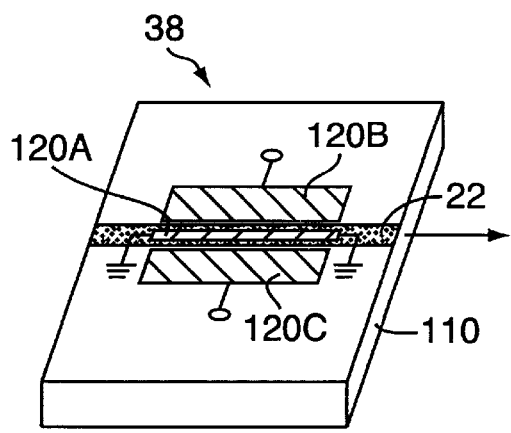
FIG. 2F illustrates yet another example of the polarization rotator of FIG. 1.

As shown in FIG. 2F, structures such as those disclosed in the aforementioned Heismann patents can also serve as a polarization rotator. The polarization rotator 38 shown in FIG. 2F includes include an inner electrode 120A and a pair of outer electrodes 120B and 120C respectively. The optical waveguide 22 passes under the inner electrode 120A. The electrodes 120A–120C and the optical waveguide 22 are disposed with the electrooptical substrate material 110. Voltages are applied to the electrodes for providing TM-TE mode conversion. However, rather high control voltages may be required.

Figure 2G:
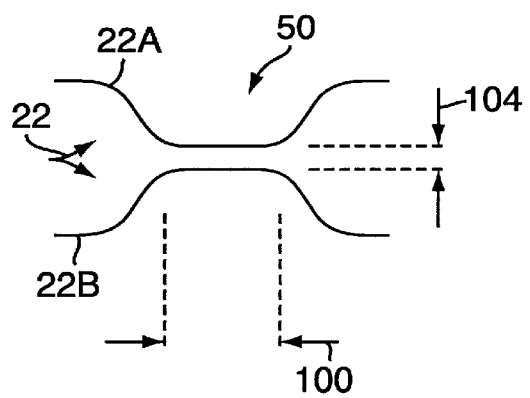
FIG. 2G illustrates an example of a coupled section of the optical waveguide pair of a transformer section of FIG. 1.
Figure 2H:
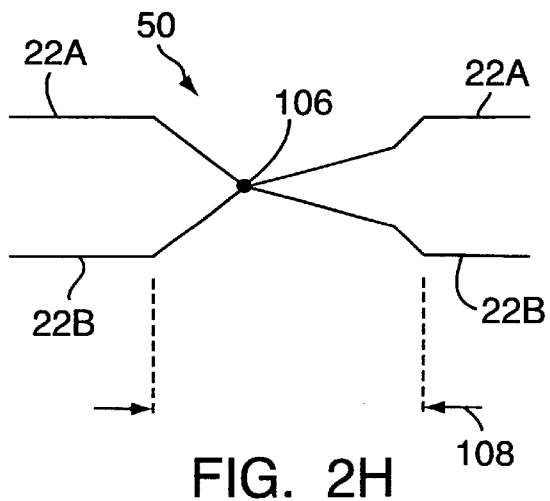
FIG. 2H illustrates another example of the coupled section of the optical waveguide pair of a transformer section FIG. 1.

FIGS. 2G and 2H illustrate embodiments of the coupling section 50 of the transformer section 40A of FIG. 1. In FIG. 2G, the coupling section 50 includes a selected length 100 of each the optical waveguides 22A and 22B. The optical waveguides 22A and 22B are disposed within a selected distance 104 of each other for providing a selected optical coupling therebetween such that the pair supports more than one mode. FIG. 2H illustrates an embodiment of the coupling section 50 including the junction 106 wherein the optical waveguides 22A and 22B are joined. The structure shown in FIG. 2H can also support a plurality of modes, typically at least within the selected distance 108.

Figure 3A:
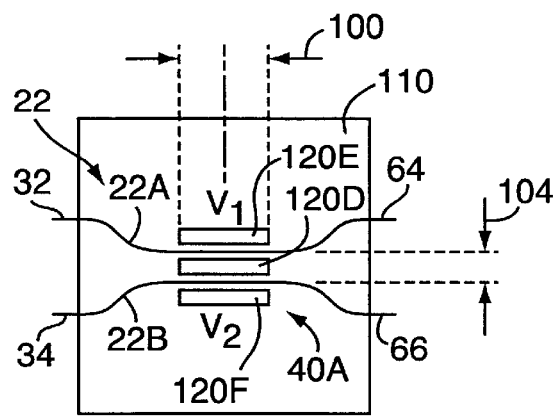
FIG. 3A illustrates one embodiment of a transformer section of the optical apparatus of FIG. 1.
Figure 3B:
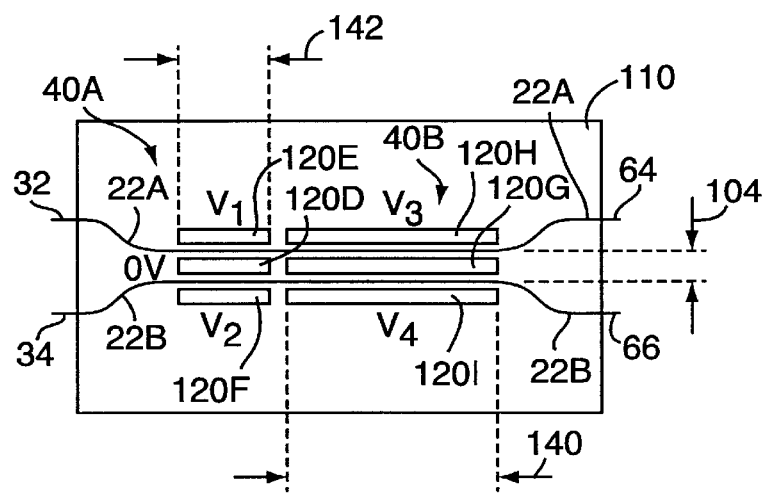
FIG. 3B illustrates an example of two cascaded transformer sections of the optical apparatus of FIG. 1.

FIGS. 3A–3B illustrate examples, respectively, of single, dual and triple transformer sections realized in accordance with the invention. With reference to FIG. 3A, the pair 21 of optical waveguides 22A and 22B are disposed with an electrooptic substrate material 110, such as lithium niobate. For example, the optical waveguides 22A and 22B can be titanium indiffused waveguides formed as is known in the art with the electrooptic substrate material 110.

Figure 4A:
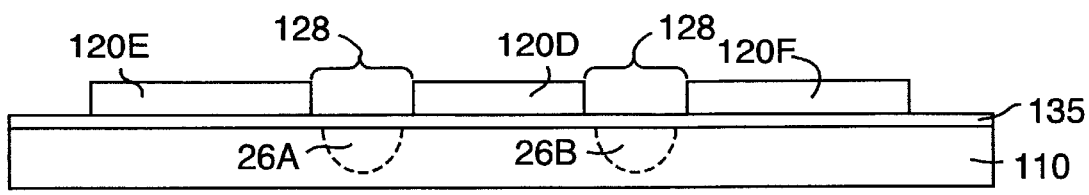
FIG. 4A is a cross section, taken along section line 4—4 of FIG. 3A, of the transformer section of FIG. 3A.
Figure 4B:
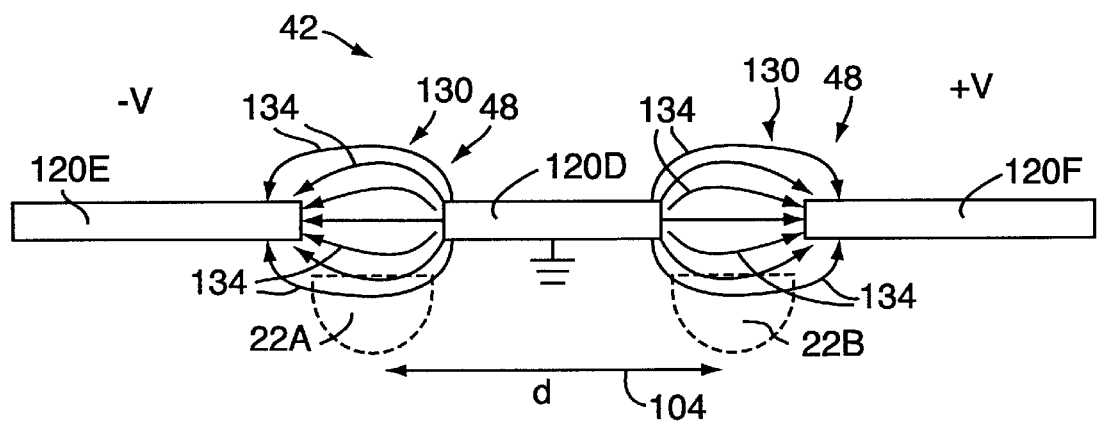
FIG. 4B is a cross section, taken along section line 4—4 of FIG. 3A, of the transformer section of FIG. 3A and includes electric fields lines corresponding to the production of an asymmetrical electric field for application to the optical waveguide pair of the transformer section of FIG. 3A.
Figure 4C:
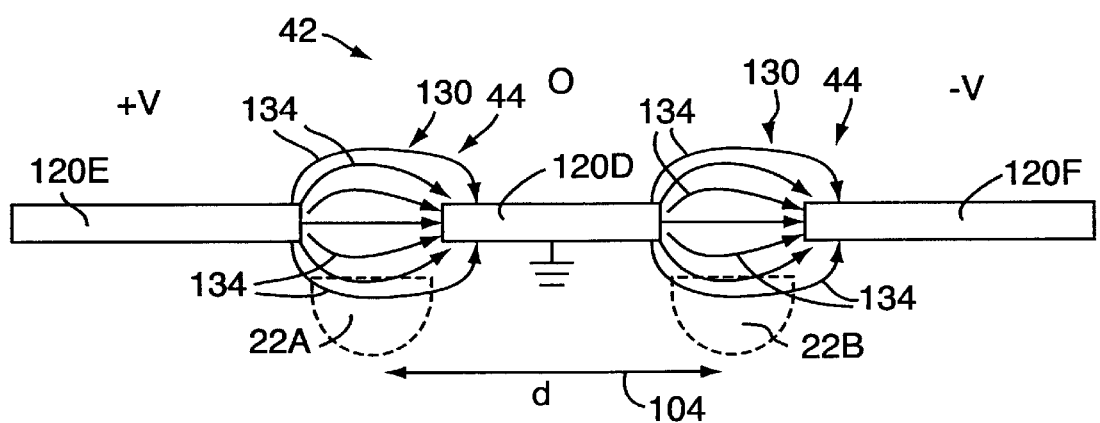
FIG. 4C is a cross section, taken along section line 4—4 of FIG. 3A, of the transformer section of FIG. 3A and includes electric fields lines corresponding to the production of a symmetric electric field for application to the optical waveguide pair of the transformer section of FIG. 3A.
Figure 4D:
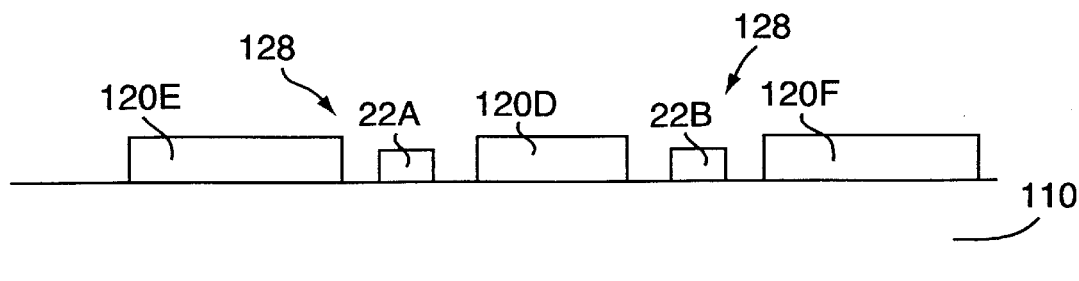
FIG. 4D illustrates a cross section, taken along section line 4—4 of FIG. 3A, of the transformer section of FIG. 3A, depicting ridge-type optical waveguides disposed proximate the pair of gaps of the transformer section.

With reference to FIGS. 3A and 4A, where FIGS. 4A–4D are cross sections taken along section line 4—4 in FIG. 3A, the electrodes of the transformer section 40A include a coplanar electrode section having an inner electrode 120D spaced from a pair of outer electrodes 120E and 120F so as to form a pair of gaps 128 therebetween, i.e., between the inner electrode 120D and each of the outer electrodes 120E and 120F. The pair 21 of optical waveguides 22A and 22B are disposed proximate the gaps 128 for exposure to electric fields 42 provided proximate the gaps, i.e., for exposure to electric field lines 134 extending between the electrodes. For the coplanar electrode section shown in FIGS. 4A–C, the electric field lines 134 typically extend between the inner electrode 120D and outer electrodes 120E and 120F, as shown in FIG. 4B. Note that the application of the same polarity and magnitude of voltage to each of the outer electrodes 120E and 120F provides an asymmetric distribution 48 of the electric fields 42, as shown in FIG. 4B, whereas the application of voltage of equal magnitude and opposite polarity provides a symmetric distribution 44 electric fields 42, as shown in FIG. 4C. As understood by one of ordinary skill, in light of the disclosure herein, application of voltages of difference polarities and/or magnitudes can be applied to electrodes to provide electric fields 42 having a selected degree of asymmetry and symmetry.

Figure 3C:
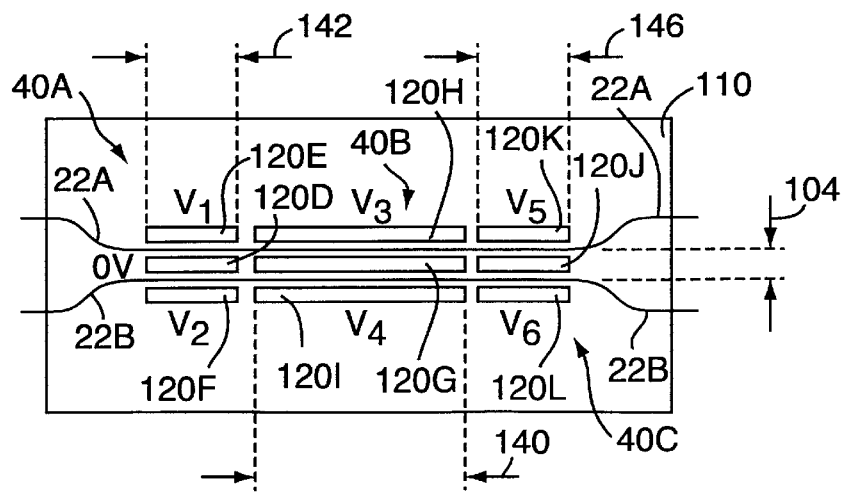
FIG. 3C illustrates an example of three cascaded transformer sections of the optical apparatus of FIG. 1.

The optical waveguides 22A and 22B are disposed within a selected distance of each other, as indicated by reference numeral 104, for a selected length 100 to provide the coupling section 50 of FIG. 1. FIG. 3B illustrates two transformer sections 40A and 40B, with the transformer section 40B typically having a length L, indicated by reference numeral 140, that is longer than the length 142 of the first transformer section 40A. The second transformer section 40B includes an inner electrode 120G and outer electrodes 120H and 120I. FIG. 3C illustrates a cascade of three transformer sections 40A, 40B and 40C, where the length 140 of the second transformer section 40B is longer than the length 142 of the first transformer section 40A and longer than the length 146 of the third transformer section 40C. In one embodiment the length 142 of the first transformer section 40A can be substantially equal to the length 146 of the third transformer section 40C.

Although each transformer section includes providing a selected coupling section 50, the distance 104 within which the optical waveguides 22A and 22B are disposed need not be same for each transformer section, and can be varied to provide a selected and different coupling for one or more of the sections. Furthermore, the transformer sections 40 shown in FIGS. 3A–3B includes coplanar electrodes arranged such that the electrodes are electrically isolated. However, depending on the desired electric field 42 to be applied, selected electrodes can be in electrical communication, such as by being part of a continuous electrode disposed with the electrooptic substrate material 110. For example, it can be advantageous to maintain all of the inner electrodes 120D, 120E and 120J at an equipotential.

Other types of suitable optical waveguides are known in the art. For example, a ridge guide can be formed above the surface of the electrooptic substrate material 110. Such ridge guides 22A and 22B are shown FIG. 4D, and are exposed to electric fields 42 developed proximate the pair of gaps 128.

The operation of transformer sections shown in FIGS. 3A–3C can be explained as follows. With reference to FIG. 3A, in the coupled section 50 of the pair or electrooptic optical waveguides, the optical waveguide 22A and 22B are proximate such that light couples between the waveguides. The coupling section 50, represented by the length 100 in FIG. 3A, supports two orthogonal waveguide modes, namely, the asymmetric and the symmetric modes. Light propagating in one of the waveguides 22A and 22B is coupled equally into these two modes; light propagating in the other of the waveguides 22A and 22B is also coupled equally into the two modes, but with a 180 degree phase difference between the two modes. In essence, the P and Q polarizations (P and Q refer to linear polarizations oriented at 45 degrees to the H and V polarizations, where the light having the predetermined polarization and input to the beam splitter 12 can be considered to be composed of the H and V polarizations) at the input to the polarization splitter 12 are injected into the symmetric and asymmetric modes supported by the coupled section 50, i.e., by the length 100 shown in FIG. 3A. Biasing the electrodes 120D–F such that the voltage $V_1$ is equal to the voltage $V_2$ produces asymmetric electric fields, an asymmetric variation to the refractive index of the optical waveguides 22A and 22B, and thus produces mode conversion between the asymmetric and symmetric modes; biasing the electrodes 120D–F such that $V_1$ is equal to the negative of $V_2$ produces symmetric electric fields, a symmetric variation in the refractive index of the index of refraction of the optical waveguides 22A and 22B, and hence produces a phase shift between the symmetric and asymmetric modes. This mode conversion and phase shifting is in effect producing mode conversion and phase shifting between the P and Q polarizations, such as occurs in a rotating waveplate. By applying appropriate voltages $V_1$ and $V_2$, the transformer section 40A operates analogously to a rotating waveplate. Similar considerations apply to FIGS. 3B and 3C, which can operate as cascades of rotating waveplates.

Proper control voltages are placed on the electrodes 120 to provide the selected symmetric and asymmetric electric fields 44 and 48, respectively. It is considered that one suitable technique for selecting the control voltages is analogous to the selection of control voltages disclosed in the aforementioned Heismann patents, such as the '743 patent referenced above. For example, in FIG. 2 of the '743 patent, an endless polarization transformer includes three cascaded transformer sections, and voltages are applied to the first, second and third transformer sections such that the transformer sections act, respectively, as the electronic analog to the quarter-wave, half- wave, quarter-wave cascade of waveplates known in the art.

Similarly, with respect to the present invention and, for example, with reference to FIG. 3C, the physical lengths (along the direction of the propagation of light in the pair of optical waveguides) and the voltage biasing of the electrodes of each the transformer sections 40A–40C are selected such that a particular transformer section acts as a waveplate of a selected wavelength at a selected angle. For example, the first transformer section 40A can act as a quarter-wave plate at a selected angle, the second transformer section 40B can act as a half-wave plate at a second selected angle, and the third transformer section 40C can act as quarter-wave plate at a third selected angle. When acting as a "plates" of a particular wavelength, a transformer section acts on the two copolarized beams of light such that one beam incurs a phase shift relative to the other beam corresponding to the "wave" of the "plate." For example, if the "plate" is a quarter-wave plate, the relative phase shift is a quarter wave. Typically, the physical length of the middle transformer section 40B, and hence the optical path length of the section of the optical waveguides associated with the middle transformer section 40B, is longer that that of "quarter-wave" transformer sections 40B and 40C, so as to reduce the voltages that are applied to the electrodes 120H and 120I.

With reference to the FIG. 2 of the Heismann patent, voltages that are the sums and differences of $V_{C1}$ and $V_{S1}$, of $V_{C2}$ and $V_{S2}$, and of $V_{C3}$ and $V_{S3}$ are applied to the electrodes of the first, second and third transformer sections, 40A, 40B and 40C, respectively. For example, common voltage $V_{C1}$ is applied to the outer electrodes relative to the center electrode to provide asymmetric fields for inducing TE-TM mode conversion, and opposing voltages of $+V_{S1}/2$ and $-V_{S1}/2$ are applied to outer electrodes of a section to provide symmetric fields for inducing TE-TM phase shift. The superposition of voltages results in one outer electrode being at a potential of $V_{C1}+V_{S1}/2$ relative to the center electrode, and the other outer electrode being at a potential of $V_{C1}-V_{S1}/2$ relative to the inner electrode. The other sections shown in FIG. 2 of the '743 patent are similarly biased. In general, the electrode biasing techniques disclosed I the Heismann patent are considered generally applicable to the present invention such that one of ordinary skill, in light of the disclosure of the present application, can determine the voltage for application to the electrodes of a transformer section of the present invention, such as the transformer section 40A, such that the transformer section acts a waveplate of a selected wavelength and at a selected angle.

With reference now to FIG. 3A of the present application, the voltage $V_1$ is analogous to $V_{C1}+V_{S1}/2$ of the Heismann patent, and the voltage $V_2$ is analogous to the voltage $V_{C1}-V_{S1}/2$, where the voltages $V_1$ and $V_2$ are referenced with regard to inner electrode 120D. The voltage for the additional transformer sections 40B and 40C can be determined in a similar fashion, e.g., $V_2$ is analogous to $V_{C2}+V_{S2}/2$, $V_4$ to $V_{C2}-V_{S2}/2$, etc., of Heismann '743 patent. See also "Analysis of a Reset-Free Polarization Controller for Fast Automatic Polarization Stabilization in Fiber-optic Transmission Systems," F. Heismann, Journal of Lightwave Technology, Vol. 12, No. 4, April 1994, herein incorporated by reference.

One of ordinary skill in the art, in light of the disclosure herein, understands that the bias voltages can be selected not only in accordance with the techniques disclosed in the aforementioned Heismann reference, but in accordance with other techniques as well. The Heismann patents provide general guidance for selecting voltages such that each of the transformer sections 40A–40C can provide an electronic analog to a waveplate. Accordingly, each of arrangements of transformer sections shown in FIGS. 3A–3C can have a variety of practical applications The electrodes 42 preferably each include a metallic conductive layer disposed with the electrooptic substrate material 110, such as deposited on the substrate material 110 or deposited on an intervening layer(s) 135 deposited on the substrate material 110, where the intervening layer 135 can be included for variety of reasons, such as for better securing the metallic layer to the substrate material 110, or to reduce the optical loss caused by the metal electrodes. The term "electrode," as used herein, includes metals disposed with the electrooptic substrate material 110, such as metals deposited on the substrate material or attached to the substrate material via intervening layers 135, as well as conductive regions formed in the substrate material via diffusion, doping or other techniques known or developed in the art and suitable for providing structures for supporting electric fields.

The use of matching layers is known in electrooptic devices. See for example, U.S. Pat. No. 5,895,742, entitled "Velocity Matched Traveling Wave Electrooptical Modulator Using A Benzocyclobutane Buffer Layer," filed Jul. 19, 1996 and herein incorporated by reference.

It is also known in the art to provide automatic polarization adjustment, and practice of the invention can include automatic adjustment of the polarization of the output light 68. With reference once again to FIG. 1, the SOP element 132 provides a feedback signal to the controller 135 such that the controller can provide appropriate voltages to the electrodes 120 and/or can control the time delay element 70 so as to provide the desired polarization transformation and/or compensation for time delay due to PMD. The SOP element 135 can include, for example, a Stokes Parameter Analyzer, which can include a rotating waveplate, a fixed linear polarizer and a detector, or in place of the rotating waveplate, a lithium niobate device; a Soleil-Babinet Compensator and a linear analyzer, a photodiode and a chopper; and an additional light source having a known polarization and a frequency (wavelength) that differs from the light having the input polarization by a selected amount and which is spatially combined on a photodetector to generate an interference signal responsive to the difference between the polarization of the second light and the input polarization. With regard to the latter technique, see, for example, "Polarization Control for Coherent Fiber-Optic Systems Using Nematic Liquid Crystals," Scott H. Rumbaugh, Michael D. Jones and Lee W. Casperson, journal of Lightwave Technology, Vol. 8. No. 3, March 1990, pp. 459–465, herein incorporated by reference.

The measurement of the fluctuation of the SOP of light and Stokes Parameter Analyzers are discussed in "Real-Time Measurements of Polarization Fluctuations in an Optical Fiber Submarine Cable in a Deep-Sea Trial Using Electrooptic LiNbO$_3$ Device," Yoshinori Namihira and Hiroharu Wakabayashi, Journal of Lightwave Technology, Vol. 7, No. 8, August 1989, pp. 1201–1206, herein incorporated by reference.

It is also known in the art for the controller to include appropriate programming for dithering the transformer sections 40A–40C of for varying the "angles" of the conceptual waveplates corresponding to the transformer sections 40A and 40B or the optical apparatus 10. The resulting dither in the polarization of the output light 68 can be converted into an intensity modulation by a polarizer in combination with phase sensitive detectors. Such a scheme and the apparatus involved are disclosed in the aforementioned Heismann patents, as well as in the article "Automatic polarization demultiplexer for polarization multiplexed transmission systems, by F. Heismann et. al., Electronic Letters, vol. 29, no. 22, Oct. 28, 1993, pages 1965–1966, herein incorporated by reference, and are considered within the scope of the invention.

The SOP element 132 can also provide a feedback signal for controlling the time delay provided by the time delay element 70. For example, as is known in the art, SOP element 132 include a receiver that demodulates information imposed on the input light 14. Selected component(s) of the demodulated signal can have selected values, such as a minimum or a maximum, when PMD delay is properly accounted for, such as by a proper delay introduced by the delay element 70. The SOP element 132 can include such a receiver for providing a feedback signal for controlling the time delay element 135.

The term "controller," as used herein, is intended to encompass at least its customary meaning in the art. A typical controller 135 includes a central processor, which can be programmable, a memory, interfacing input and output circuitry for interfacing with devices and components external to the controller, and a databus for communication between the central processor, the memory and the interfacing input and output circuitry. The memory usually includes a volatile random access memory (RAM) and well as a non volatile memory, such as a hard drive. A display, keyboard, and pointing and selecting device, such as a mouse, can be included as well. In many of the embodiments shown herein, one of ordinary skill will understand the controller to include a power supply for providing the voltages for biasing the electrodes.

Figure 5A:
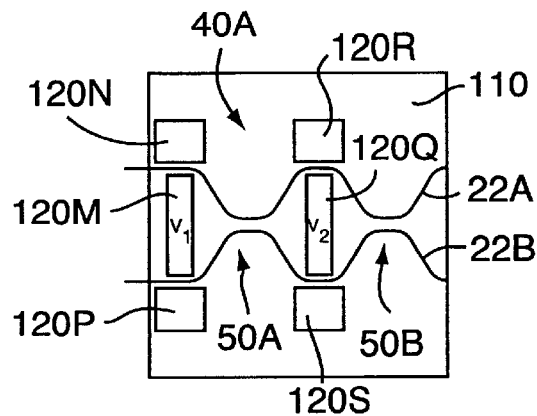
FIG. 5A illustrates a second embodiment of a transformer section of the optical apparatus of FIG. 1.
Figure 5B:
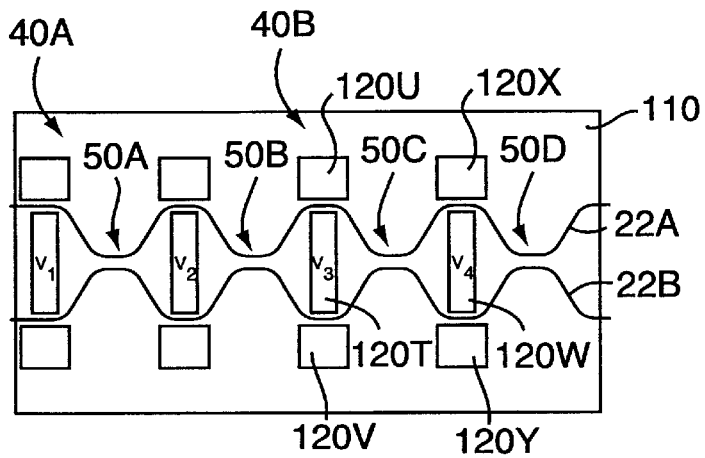
FIG. 5B illustrates two cascaded transformer sections of the optical apparatus of FIG. 1, where each of the transformer section corresponds to the embodiment shown in FIG. 5A.
Figure 5C:
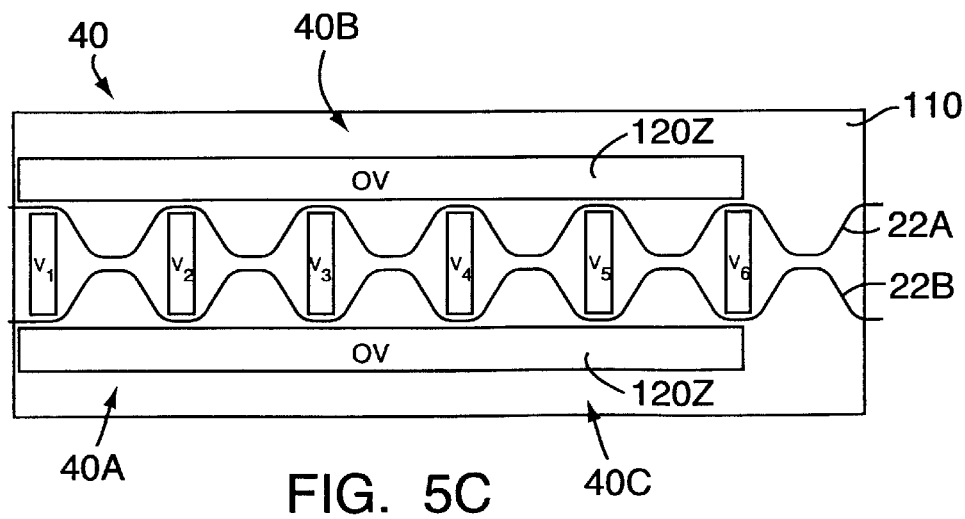
FIG. 5C illustrates three-cascaded transformer sections of the optical apparatus of FIG. 1, where each transformer section corresponds to the embodiment shown in FIG. 5A.

FIGS. 5A–5C illustrate alternative embodiments of the invention including single, dual and triple transformer sections respectively. Each transformer section 40 includes two coplanar electrode sections. For example, with reference to FIG. 5A, the transformer section 40A includes a first coplanar electrode section including the inner electrode 120M and the pair of outer electrodes 120N and 120P, and the second coplanar electrode section includes the inner electrode 120Q and the pair of outer electrodes 120R and 120S. The coupling section 50 includes a first and second coupled sections 50A and 50B, wherein a selected length of each of the optical waveguides are disposed within a selected distance of each other for providing coupled sections each capable of supporting at least two modes. The coupled sections 50A and 50B are alternately interposed with the coplanar electrode sections, and preferably each coupled section couples 50% of the energy from the optical waveguide 22A to the optical waveguide 22B and vice-versa, that is, the coupled sections 50A and 50B are preferably 50% couplers. The lengths of the optical waveguides 22A and 22B disposed proximate the gaps 128 formed by the coplanar waveguide sections need not be optically coupled. FIGS. 5B and 5C illustrate cascades of two and three transformer sections, respectively. The bias voltages $V_1$, $V_2$, etc., can be determined as discussed above in conjunction with FIGS. 3A–3B, wherein the voltages are applied to the inner electrodes, such as electrodes 120P, 120Q, 120T and 120W and referenced to the outer electrodes. Accordingly, primarily asymmetric electric fields are applied to the optical waveguides 22A and 22B for varying the phase of the light propagating along one of the optical waveguides relative to the other of the optical waveguides of the pair.

One approach to understanding the operation of the apparatus shown in FIGS. 5A–5C is as follows. With reference to FIG. 5A, application of a voltage $V_1$ to the electrode 120M, wherein electrodes 120N and 120P are grounded, produces a phase shift between the beams propagating on the optical waveguides 22A and 22B, effectively producing a phase shift between the "H" and "V" polarizations of the light input to the beamsplitter 12 of FIG. 1. A voltage $V_2$ applied to the electrode 120Q relative to the electrodes 120R and 120S, which are grounded, effectively produces a power transfer between the "H" and "V" polarizations. By adjusting $V_1$ and $V_2$ the transformer section 40A can be made to behave akin to an endlessly rotatable waveplate. FIGS. 5B and 5C represent cascades of two and three waveplates, respectively.

According to one practice of the invention, the outer electrodes 124N, 120P, 120Q, 120S, 120U, 120V, 120X and 120Y, as well as the outer electrodes of the third transformer section 40C, are maintained at the same potential, and accordingly, as shown in FIG. 5C, can correspond to portions of a single pair 120Z of outer electrodes, or otherwise be in electromagnetic communication.

As understood by those or ordinary skill in the art, in light of the disclosure herein, electrooptic substrate material 110 can be other than lithium niobate, including, but not limited to, semiconductor materials and lithium tantalate, for example.

The transformer sections 40A, 40B, and 40C shown in the foregoing FIGS. 3 and 5 need not be formed on the same substrate. Each transformer section can be disposed with a separate substrate, each including an electrooptic substrate material. The optical waveguides of each transformer section are in maintained in optical communication, such as by appropriate lengths of polarization maintaining fiber. However, it is preferred that the multiple transformer sections, as shown in FIGS. 3 and 5, are formed on a single substrate of electrooptic substrate material 110.

Shown in FIGS. 6A–6C are various embodiments of the present invention. FIG. 6A illustrates the polarization splitter 12 in optical communication with the electroptic optical waveguides 22A and 22B disposed with the electrooptic substrate material 110. The lengths of polarization maintaining fiber 74, 74A, 74B, 74C and 74D, which provide optical communication between the polarization splitter 12 and between the transformer sections 40A–40C and the delay element 70 and combiner 60. The polarization rotators 38A and 38B can include the length of polarization fiber 74C being rotated relative to the length 74D, and the length 74A being rotated relative to the length 74B, such as is shown in FIG. 2E.

Note that the polarization controller according to the present invention need not include both the polarization splitter 12 and the beam combiner 60, and a beam splitter can also be used in place of the polarizing beam splitter 12. For example, with reference to FIG. 6B, input light having a linear polarization can be transformed into an output light having a selected polarization. The linearizer 150 can be included as shown to ensure that polarization of the input light 14 is of a linear polarization. Optionally, as is also shown in FIG. 6B, the beam splitter 163 splits the input beam 14' as shown. The linearizer 150' can be included as shown to ensure that the beam incident on the beam splitter 163 is linearly polarized. The two transformer sections 40A and 40B are exemplary. The apparatus shown in FIG. 6B can typically provide an output beam having an output SOP selected from a wide range of SOPs. However, some optical energy of the input beam is wasted by the linearizer 150 (or 150'), which can be a polarizing plate.

FIG. 6C illustrates an embodiment of the invention wherein an input beam of light having an arbitrary input SOP can be transformed into light having selected linear output SOP. Note that an output combiner is not included. The embodiment shown in FIG. 6C uses a reduced number of active elements. See for example "Polarization Transformers With Fewer Control Elements," J. L. Nightingale and R. A. Becker of Crystal Technology, Inc., 1040 E. Meadow Circle, Palo Alto, Calif. herein incorporated by reference.

Figure 7:
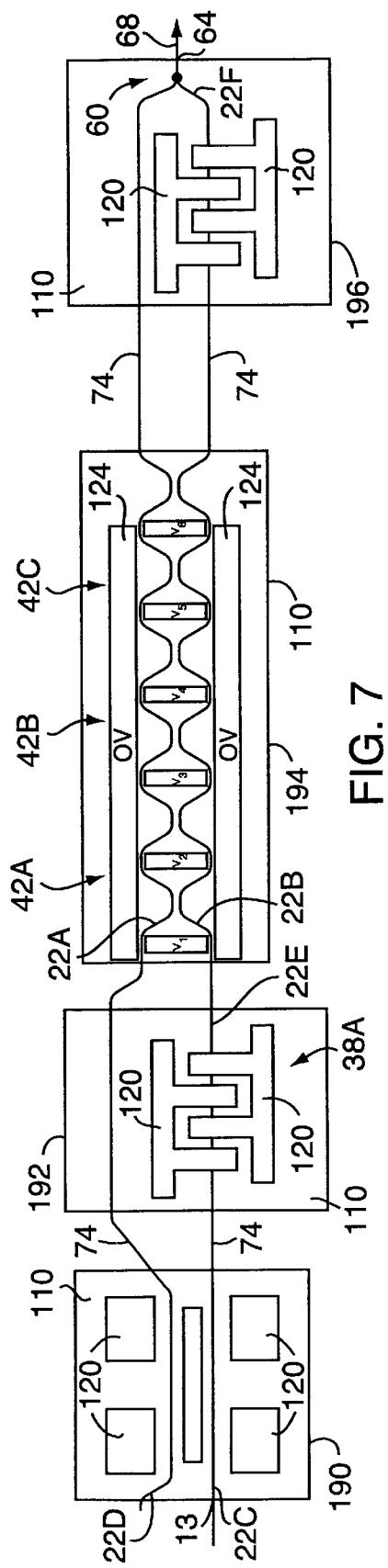
FIG. 7 illustrates a further embodiment of an optical apparatus according to the invention.

FIG. 7 illustrates another embodiment of the invention. The polarization beam splitter 12 is formed as disclosed in "Polarization-Independent Electro-Optically Tunable Narrow-Band Wavelength Filter," W. Warzanskyj, F. Heismann, and R. C. Alferness, Applied Physics Letters, 53(1), Jul. 4, 1988, p 13–15, herein incorporated by reference.

The polarization splitter 12 can have a structure similar to the beam combiner 60 of FIG. 2C. The polarization rotators 38A and 38B are the low control voltage interdigitated TM-TE mode shifters shown in FIG. 2D and disclosed in "Electro-optic Waveguide TE-TM Mode Converter With Low Drive Voltage," R. C. Alferness and L. L. Buhl, Optics Letters. Vol. 5, No. 11, November 1980, pp. 473–475, herein incorporated by reference., and include the interdigitated electrodes 120. Alternatively, one or both of the polarization rotators 38A and 38B can be based on structure disclosed in the above-referenced Heismann patents and shown in FIG. 2F. The transformer sections 40A, 40B and 40C are implemented as shown in FIG. 6C, or as in FIG. 3C. The combiner 60 combines the orthogonal polarization components into the output light 68 having the selected SOP. The components are shown as optically communicating via lengths of polarization maintaining fiber 74, though as understood by one of ordinary skill, optical components can optically communicate in a number or other ways, such as by butting up the edges of one or more of the substrates 190–196 together, via free space and the use of appropriate lens elements. Each of the discrete substrates 190–196 includes electrooptic substrate material 110, though the various substrates 190–196 need not be of the same type of electrooptic substrate material 110 or of the same propagation orientation and/or cut. It is also considered within the scope of the invention to include the apparatus shown in FIG. 7 on a single substrate.

Figure 8:
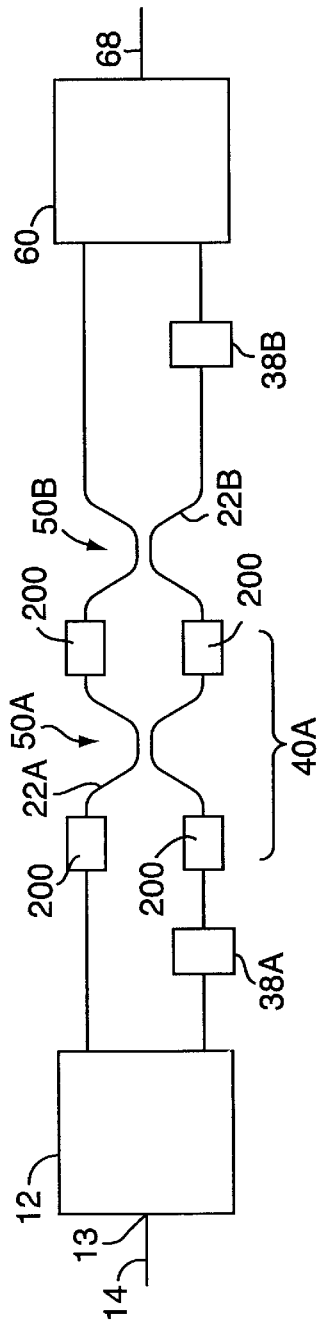
FIG. 8 illustrates yet another embodiment of an optical apparatus according to the invention.

Note that the invention can be practiced without the use of electroptic optical waveguides, though perhaps with some sacrifice in speed. For example, with reference to FIG. 8, fiber squeezers 200 can be included for providing selected phase shifts between light propagating on the optical waveguides 22A and 22B, which in the embodiment shown in FIG. 8 are polarization maintaining fibers. Heaters can be used as a substitute for one or more of the fiber squeezers 200. As with the application of an electric field to an electrooptic optical fiber, heating and squeezing an optical fiber varying the index of refraction of the optical fiber.

Note that the term electrooptical "optical waveguide", as used herein, refers to a waveguide behaving electrooptically in those regions of the waveguide where exposure to electric fields is a necessary aspect of the functioning of the present invention. For example, the waveguides 22A and 22B need not behave electrooptically everywhere, such as in the coupled sections 50.

Several embodiments of the invention are disclosed above, and are intended as illustrative of apparatus and methods for practicing the invention, and not as limiting. One of ordinary skill in the art, with knowledge of the present disclosure, can likely envision other embodiments, or variations of the disclosed embodiments, that encompass and achieve the purpose the present invention. Accordingly, these other embodiments and variations are deemed within the scope of the present invention.

It is understood that the following claims are to cover all generic and specific features of the invention described herein, and all statements of the scope of the invention, which, as a matter of language, might be said to fall therebetween.

Having described the invention, what is claimed as new and secured by Letters Patent is:

1. An optical apparatus for transforming the polarization of light from an input polarization to a selected output polarization, comprising:
    a pair of electrooptic optical waveguides including at least one coupled section, each electrooptical optical waveguide of said pair having an input and an output;
    a plurality of electrodes for exposing said optical waveguides of said pair to selected electric fields;
    an input beam splitter having an input and two outputs, the input for receiving light having the input polarization and for splitting the light into two outputs, each of the outputs in optical communication with a different input of said optical waveguides of said pair, said optical communication achieved so as to provide substantially copolarized light to said electrooptic optical waveguides of said pair; and
    an optical combiner having first and second combiner inputs and a combiner output, each of said inputs in optical communication with a different output of said optical waveguides of said pair of optical waveguides, the optical communication being achieved such that said combiner inputs receive light from said pair of optical waveguides as substantially orthogonally polarized; and
    whereby selective application of voltages to said electrodes produces said electric fields such that the light having the input polarization and entering one of an input of a first of said electrooptic optical waveguides and said input of said splitter is transformed to light having the selected polarization and emanating from one of an output of one of said electrooptic optical waveguides and said output of said combiner.

2. The apparatus of claim 1 wherein said combiner is included, the apparatus further including a time delay element for providing a selected time delay, said time delay element interposed between the output of one of said waveguides and one of the inputs to said combiner.

3. The apparatus of claim 1 including said beam splitting and further including a linearizing element disposed upstream of said beam splitter such that the input polarization of the light received by the beam splitter is a linear polarization.

4. The apparatus of claim 1 including said beam combiner and including a polarization rotator disposed between one of the outputs of said electrooptic optical waveguides of said pair and one of the inputs of said combiner for achieving the optical communication between the combiner and said pair of optical waveguides such that the light received by the inputs of said combiner is substantially orthogonally polarized.

5. The apparatus of claim 1 including said beam splitter and wherein said beam splitter is a polarizing beam splitter, the outputs thereof for providing substantially orthogonal components of the light entering the input of the beam splitter, and wherein the optical apparatus includes a polarization rotator disposed between one of the outputs of said beam splitter and one of the inputs of said electrooptic optical waveguides of said pair for achieving the optical communication between the beam splitter and with said optical waveguides wherein the light received by said optical waveguides is substantially copolarized.

6. An optical apparatus for transforming the polarization of light from an input polarization to a selected output polarization, comprising:
    a pair of electrooptic optical waveguides including at least one coupled section, each electrooptical optical waveguide of said pair having an input and an output;
    a plurality of electrodes for exposing said optical waveguides of said pair to selected electric fields and
    at least one of the following:
        an input beam splitter having an input and two outputs, the input for receiving light having the input polarization and for splitting the light into two outputs, each of the outputs in optical communication with a different input of said optical waveguides of said pair, said optical communication achieved so as to provide substantially copolarized light to said electrooptic optical waveguides of said pair; and
        an optical combiner having first and second combiner inputs and a combiner output, each of said inputs in optical communication with a different output of said optical waveguides of said pair of optical waveguides, the optical communication being achieved such that said outputs receive light from said pair of optical waveguides as substantially orthogonally polarized; and
        whereby selective application of voltages to said electrodes produces said electric fields such that the light having the input polarization and entering one of an input of a first of said electrooptic optical waveguides and said input of said splitter is transformed to light having the selected polarization and emanating from one of an output of one of said electrooptic optical waveguides and said output of said combiner and
        wherein said plurality of electrodes includes a plurality of sections of coplanar electrodes, each section including an inner electrode spaced from a pair of outer electrodes by a pair of gaps and wherein for each coplanar electrode section a selected length of each optical waveguide of said pair is disposed proximate a different gap of said pair of gaps for being exposed to electric field lines extending between those electrodes spaced so as to form said different gap, and wherein said at least one coupled section includes a plurality of coupled sections of said pair of optical waveguides, said coupled sections being alternately interposed with said sections of coplanar electrodes.

7. The optical apparatus of claim 1 wherein said at least one coupling section includes said optical waveguides of said pair being disposed within a selected distance of each other for a selected coupling length along each of the optical waveguides.

8. The optical apparatus of claim 1 wherein said at least one coupling section includes a junction between said optical waveguides of said pair of optical waveguides.

9. The optical apparatus of claim 1 including a SOP element for providing a feedback signal responsive to the output polarization and a controller responsive to the feedback signal and in electric communication with said electrodes for selectively applying voltage to said electrodes responsive to said feedback signal.

10. The apparatus of claim 1 including both said beam splitter and said output combiner, said beam splitter being a polarizing beam splitter, the apparatus including first and second polarization rotators, said first polarization rotator disposed between one of the outputs of said beam splitter and one of the inputs of said electrooptic optical waveguides of said pair for achieving the optical communication between the beam splitter and said optical waveguides wherein the light received by the inputs of said optical waveguides is substantially copolarized, and said second polarization rotator disposed between one of the outputs of said electrooptic optical waveguides of said pair and one of the inputs of said combiner for achieving the optical communication between the combiner and said pair of optical waveguides such that the light received by the inputs of said combiner is substantially orthogonally polarized.

11. An optical apparatus for selectively controlling the polarization of light, comprising:

at least first and second transformer sections, each of said transformer sections including an electrooptic substrate material;

a pair of optical waveguides disposed with said electrooptic substrate material;

at least one section of coplanar electrode structure disposed with said electrooptic substrate material and having an inner electrode spaced from a pair of outer electrodes by a pair of gaps and wherein a first length of each optical waveguide of said pair is disposed proximate a different gap of said pair of gaps for being exposed to electric fields developed proximate said different gap; and wherein said optical waveguides of said pair are selectively optically coupled for selectively transferring light energy therebetween;

said pairs of optical waveguides of said transformer sections being in optical communication to form first and second optical waveguides each having an input end and an output end downstream of said input end;

a polarization splitter having an input and two outputs, the outputs for providing substantially orthogonally polarized components of the light entering said input of said polarization splitter, one of said outputs in optical communication with the input of said first optical waveguide and the other of said outputs in optical communication with said input of said second optical waveguide, said optical communication being achieved such that the light received by first and second optical waveguides is substantially copolarized; and an optical combiner having first and second combiner inputs and a combiner output, one of said combiner inputs in optical communication with the output of said first optical waveguide and the other said combiner inputs in optical communication with the output of said second optical waveguide, whereby selective application of voltages between said inner electrodes and said outer electrodes of said transformer sections can selectively transform light of a predetermined polarization entering said input of said input polarization splitter into output light, emanating from the combiner output of said output combiner, having a selected polarization.

12. The optical apparatus of claim 11 wherein the optical path length of each of said optical waveguides of said waveguide pair of said second transformer section is longer than the optical path length of each of said optical waveguides of said optical waveguide pair of said first transformer section.

13. The optical apparatus of claim 11 wherein said first lengths are disposed within a selected distance of each other for providing said selected optical coupling.

14. The optical apparatus of claim 11 wherein each transformer section includes an optical coupling section including a selected coupling length along each of said optical waveguides of said pair wherein said optical waveguides are disposed within a selected distance of each other for providing said selected coupling therebetween, said optical coupling section being distinct from said coplanar electrode section.

15. The optical apparatus of claim 11 wherein at least one of said transformer sections includes a second coplanar electrode section disposed with said electrooptic substrate of that transformer section, said second coplanar electrode section having an inner electrode spaced from a pair of outer electrodes by a pair of gaps and wherein a second length of each optical waveguide of said pair is disposed proximate a different gap of said pair of gaps for being exposed to electric fields developed across said different gap; and wherein said at least one transformer section further includes first and second coupling sections for providing said selected optical coupling, said first coupling section including a first selected coupling length along each of said optical waveguides of said pair wherein said optical waveguides are disposed within a selected distance of each other, and said second coupling section including a second selected coupling length along each of said optical waveguides of said pair wherein said optical waveguides of said pair are disposed within a second selected distance of each other, said coupling sections and said coplanar electrode sections being distinct and alternatively interposed.

16. The optical apparatus of claim 11 wherein said optical combiner includes a polarization splitter.

17. The optical apparatus of claim 11 wherein said transformer sections are disposed with a single substrate of said electrooptic substrate material and wherein said electrooptic substrate material includes lithium niobate.

18. The optical apparatus of claim 11 wherein said pairs of optical waveguides of said transformer sections are titanium indiffused waveguides and wherein said electrooptic substrate material includes lithium niobate.

19. The optical apparatus of claim 11 wherein said electrooptic substrate material of at least one of said transformer sections includes lithium niobate.

20. The optical apparatus of claim 11 wherein said at least one of said electrooptic substrate materials of said transformer sections includes a y-cut, x-propagating oriented substrate material.

21. The optical apparatus of claim 11 wherein at least one of electrooptic substrate material of said transformer sections includes a z-cut, y propagating oriented substrate material.

22. The optical apparatus of claim 11 wherein said electrooptic substrate materials of said transformer sections are substantially identical.

23. The optical apparatus of claim 11 wherein said electrooptic substrate materials of said transformer sections are part of a single-piece electrooptic substrate.

24. The optical apparatus of claim 11 including a delay element interposed between one of said outputs of said polarization splitter and one of said inputs of said combiner and in optical communication with one of said first and second optical waveguides for providing a selected time delay to one of said first and second optical beams.

25. The optical apparatus of claim 11 including a delay element interposed between one of said outputs of said first and second optical waveguides and one of said inputs for said combiner for providing a selected time delay to one of said first and second optical beams.

26. The optical apparatus of claim 11 wherein said inner electrodes of said coplanar electrode sections of said transformer sections are in electromagnetic communication so as to be the same potential with respect to any one of said outer electrodes of said coplanar electrode sections of said transformer sections.

27. The optical apparatus of claim 11 wherein said outer electrodes of said coplanar electrode sections of said transformer sections are in electromagnetic communication so as to be at the same potential with respect to any one of said inner electrodes of said coplanar electrode sections of said transformer sections.

28. The optical apparatus of claim 11 including a third transformer section, the optical path length of each of the optical waveguides of the optical waveguide pair of the third section being substantially equal to the optical path length of each optical waveguides of the pair of optical waveguides of said first transformer section.

29. The optical apparatus of claim 28 wherein said second transformer section is interposed between said first and third transformer sections, and wherein the optical path length of each of the optical waveguides of the optical waveguide pair of said second transformer section is longer than the optical path length of each of the optical waveguides of said optical waveguide pair of said first transformer section.

30. A method of transforming the polarization of light from a predetermined polarization to a selected polarization, comprising the steps of:
splitting an input beam of the light of the predetermined polarization into first and second beams;
providing first and second electrooptic optical waveguides, selected lengths of the optical waveguides being optically coupled;
providing the first and second beams, respectively, to the first and second electrooptic optical waveguides, each having a respective output, the step of providing including providing the first and second beams to the optical waveguides as substantially copolarized;
selecting first and second electric fields to apply, respectively, to the first and second electrooptic optical waveguides;
applying the first and second selected electric fields, respectively, to the first and second electrooptic optical waveguides;
combining the first and second beams downstream of the outputs of the first and second electrooptic optical waveguides to form an output beam having the selected polarization, and
wherein the step of selecting the first and second electric fields includes selecting the fields such that the first and second beams are varied such that the beams, when combined, form the output beam having the selected polarization.

31. The method of claim 30 wherein the step of splitting the input beam having the predetermined polarization includes providing a polarization splitter having an input and two outputs, the input for receiving the light having the predetermined polarization and the outputs for providing the first and second beam as substantially orthogonally polarized components of the light having the predetermined polarization.

32. The method of claim 30 wherein the step of providing first and second electrooptic optical waveguides includes the step of providing first and second optical waveguides disposed with a lithium niobate substrate material.

33. The method of claim 30 wherein the step of providing first and second electrooptic optical waveguides includes the step of providing first and second optical waveguides disposed with a y-cut and x-propagating electrooptic substrate material.

34. The method of claim 30 wherein the step of providing first and second electrooptic optical waveguides includes the step of providing first and second optical waveguides disposed with a z-cut, y propagating electrooptic substrate material.

35. A method of transforming the polarization of light from a predetermined polarization to a selected polarization, comprising the steps of:
splitting an input beam of the light of the predetermined polarization into first and second beams;
providing first and second electrooptic optical waveguides, selected lengths of the optical waveguides being optically coupled;
providing the first and second beams, respectively, to the first and second electrooptic optical waveguides, each having a respective output, the step of providing including
providing the first and second beams to the optical waveguides as substantially copolarized;
selecting first and second electric fields to apply, respectively, to the first and second electrooptic optical waveguides;
applying the first and second selected electric fields, respectively, to the first and second electrooptic optical waveguides;
combining the first and second beams downstream of the outputs of the first and second electrooptic optical waveguides to form an output beam having the selected polarization, and
wherein the step of selecting the first and second electric fields includes selecting the fields such that the first and second beams are varied such that the beams, when combined, form the output beam having the selected polarization and wherein
wherein the step of providing first and second electrooptic optical waveguides includes the step of providing first and second optical waveguides disposed with a lithium niobate substrate material and wherein the step of applying first and second selected electric fields includes disposing at least one section of coplanar electrode structure with the electrooptic substrate material, the coplanar electrode structure having an inner electrode spaced from a pair of outer electrodes by a pair of gaps and disposing a first length of each optical waveguide of the pair proximate a different gap of the pair of gaps, and selectively applying voltages between the inner and outer electrodes for providing the first electric field proximate one of the gaps and the second electric field proximate the other of the gaps for exposure of the first lengths of the optical waveguides to the first and second electric fields.

36. A method of transforming the polarization of light from a predetermined polarization to a selected polarization, comprising the steps of:

splitting an input beam of the light of the predetermined polarization into first and second beams;

providing first and second electrooptic optical waveguides, selected lengths of the optical waveguides being optically coupled;

providing the first and second beams, respectively, to the first and second electrooptic optical waveguides, each having a respective output, the step of providing including providing the first and second beams to the optical waveguides as substantially copolarized;

selecting first and second electric fields to apply, respectively, to the first and second electrooptic optical waveguides;

applying the first and second selected electric fields, respectively, to the first and second electrooptic optical waveguides;

combining the first and second beams downstream of the outputs of the first and second electrooptic optical waveguides to form an output beam having the selected polarization, and wherein the step of selecting the first and second electric fields includes selecting the fields such that the first and second beams are varied such that the beams, when combined, form the output beam having the selected polarization and wherein the step of providing first and second electrooptic optical waveguides includes the step of providing first and second optical waveguides disposed with a lithium niobate substrate material and wherein the step of applying first and second selected electric fields includes disposing first and second sections of coplanar electrode structure with the electrooptic substrate material, each section of coplanar electrode structure having an inner electrode spaced from a pair of outer electrodes by a pair of gaps; and disposing a first length of each optical waveguide proximate a different gap of the pair of gaps of the first coplanar electrode section;

disposing a second length of each optical waveguide of the pair proximate a different gap of the pair of gaps of the second coplanar electrode section, the second lengths each having an optical path length at a wavelength of the light having the predetermined polarization that is longer than the optical path length of the first lengths at that wavelength; and selectively applying voltages between the inner and outer electrodes of the first coplanar electrode structure section and between the inner and outer electrodes of the second coplanar electrode structure section for providing the first and second electric fields proximate the gaps for exposure of the first second lengths of the optical waveguides to the first and second electric fields.

37. The method of claim 36 wherein the step of providing first and second electrooptic optical waveguides having selected coupled sections includes disposing the first lengths within a selected distance of each other for providing a selected coupling therebetween and disposing the second lengths within a selected distance of each other for a selected optical coupling therebetween.

38. The method of claim 36 wherein the step of applying first and second electric fields further includes disposing a third section of coplanar electrode structure with the electrooptic substrate material such that the second coplanar electrode structure section is disposed between the first and third coplanar electrode structure sections, the third coplanar electrode section including an inner electrode spaced from a pair of outer electrodes by a pair of gaps, and disposing a third length of each optical waveguide proximate a different gap of the pair of gaps of the third coplanar electrode structure section, the second lengths having an optical path length, at a wavelength of the light having the predetermined polarization, that is longer than the optical path lengths at that wavelength of the first and second lengths of the optical waveguides; and wherein the step of providing first and second electrooptic optical waveguides having selected coupled sections includes disposing the first lengths within a selected distance of each other for providing a first selected coupling therebetween, disposing the second lengths within a selected distance of each other for providing a second selected optical coupling therebetween, and disposing the third lengths within a selected distance of each other for providing a third selected optical coupling therebetween.

39. A method of transforming the polarization of light from a predetermined polarization to a selected polarization, comprising the steps of:

splitting an input beam of the light of the predetermined polarization into first and second beams;

providing first and second electrooptic optical waveguides, selected lengths of the optical waveguides being optically coupled;

providing the first and second beams, respectively, to the first and second electrooptic optical waveguides, each having a respective output, the step of providing including providing the first and second beams to the optical waveguides as substantially copolarized;

selecting first and second electric fields to apply, respectively, to the first and second electrooptic optical waveguides;

applying the first and second selected electric fields, respectively, to the first and second electrooptic optical waveguides;

combining the first and second beams downstream of the outputs of the first and second electrooptic optical waveguides to form an output beam having the selected polarization, and wherein the step of selecting the first and second electric fields includes selecting the fields such that the first and second beams are varied such that the beams, when combined, form the output beam having the selected polarization and wherein the step of providing first and second electrooptic optical waveguides includes the step of providing first and second optical waveguides disposed with a lithium niobate substrate material and wherein the step of applying first and second electric fields includes disposing a plurality of coplanar electrode sections with the electrooptic substrate material, each section of the plurality including an inner electrode spaced from a pair of outer electrodes by a pair of gaps, for each coplanar electrode section, disposing a length of each optical waveguide proximate a different gap of the pair of gaps of the coplanar electrode section; and selectively applying voltages between the inner and outer electrodes of the plurality of coplanar electrode sections for providing the first and second electric fields proximate the gaps of the sections for exposure of the lengths of the electrooptic optical waveguides to the first and second electric fields; and wherein the step of providing first and second optical waveguides includes providing a plurality of coupling sections of the first and second waveguides wherein the waveguides are disposed within selected distances or each other, the coupling section being alternatively interposed with and distinct from the coplanar electrode sections.

40. The method of claim 39 wherein providing a plurality of coplanar electrode sections includes providing at least four coplanar electrode sections and wherein providing a plurality of coupling sections includes providing at least four coupling sections, wherein two of the coplanar electrode sections and the two of the coupling sections form a first transformer section and two different coplanar electrode sections and two different coupling sections form a second transformer section, and the optical path lengths along the portion if the optical waveguide corresponding to the first transformer section being longer than the optical path lengths along the optical waveguides corresponding to the second transformer section, the optical path lengths corresponding to a wavelength of the light having the predetermined polarization.

41. A method of transforming the polarization of light from a predetermined polarization to a selected polarization, comprising the steps of:

splitting an input beam of the light of the predetermined-polarization into first and second beams;

providing first and second electrooptic optical waveguides, selected lengths of the optical waveguides being optically coupled;

providing the first and second beams, respectively, to the first and second electrooptic optical waveguides, each having a respective output, the step of providing including providing the first and second beams to the optical waveguides as substantially copolarized;

selecting first and second electric fields to apply, respectively, to the first and second electrooptic optical waveguides;

applying the first and second selected electric fields, respectively, to the first and second electrooptic optical waveguides;

combining the first and second beams downstream of the outputs of the first and second electrooptic optical waveguides to form an output beam having the selected polarization, and wherein the step of selecting the first and second electric fields includes selecting the fields such that the first and second beams are varied such that the beams, when combined, form the output beam having the selected polarization and wherein the step of combining the first and second beams includes providing an output polarization splitter having first and second inputs and an output, and providing the light from the outputs of the first and second optical waveguides, respectively, to the first and second inputs, respectively, of the output polarization splitter, the first and second beams being provided to the inputs of the output polarization splitter as substantially orthogonally polarized.

* * * * *